United States Patent
Popov

(10) Patent No.: US 10,931,517 B2
(45) Date of Patent: Feb. 23, 2021

(54) METHODS AND SYSTEMS THAT SYNCHRONIZE CONFIGURATION OF A CLUSTERED APPLICATION

(71) Applicant: VMware, Inc., Palo Alto, CA (US)

(72) Inventor: Emil Popov, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 505 days.

(21) Appl. No.: 15/665,092

(22) Filed: Jul. 31, 2017

(65) Prior Publication Data

US 2019/0036766 A1    Jan. 31, 2019

(51) Int. Cl.
*H04L 12/24* (2006.01)
*H04L 29/08* (2006.01)
*H04L 29/06* (2006.01)

(52) U.S. Cl.
CPC .......... *H04L 41/08* (2013.01); *H04L 41/0873* (2013.01); *H04L 63/123* (2013.01); *H04L 67/10* (2013.01); *H04L 67/1095* (2013.01); *H04L 67/34* (2013.01); *H04L 41/0813* (2013.01); *H04L 41/5054* (2013.01); *H04L 41/5096* (2013.01); *H04L 63/126* (2013.01); *H04L 63/20* (2013.01)

(58) Field of Classification Search
CPC ..... H04L 41/08; H04L 67/34; H04L 67/1095; H04L 63/123; H04L 41/0873; H04L 67/10; H04L 63/126; H04L 63/20; H04L 41/0813; H04L 41/5054; H04L 41/5096
See application file for complete search history.

(56) References Cited

U.S. PATENT DOCUMENTS

| | | | | |
|---|---|---|---|---|
| 7,392,421 B1* | 6/2008 | Bloomstein | ......... | G06F 11/1482 714/4.4 |
| 8,589,574 B1* | 11/2013 | Cormie | ................. | G06F 3/0607 709/230 |
| 9,304,945 B2* | 4/2016 | Goddard | ............. | G06F 12/1491 |
| 9,971,826 B1* | 5/2018 | Belmar | .................... | G06F 9/544 |
| 2004/0019670 A1* | 1/2004 | Viswanath | .......... | H04L 41/0253 709/223 |
| 2004/0128370 A1* | 7/2004 | Kortright | .............. | H04L 69/329 709/221 |
| 2006/0080592 A1* | 4/2006 | Alves de Moura | ....... | G06F 8/38 717/120 |
| 2008/0104215 A1* | 5/2008 | Excoffier | ................ | H04L 69/40 709/223 |
| 2009/0157802 A1* | 6/2009 | Kang | .................... | G06F 16/275 709/203 |

(Continued)

*Primary Examiner* — Oanh Duong

(57) ABSTRACT

The current document is directed a distributed application in which a common configuration is maintained across the applications instances. In a disclosed example, a workflow-development-and-process-automation application is distributed across multiple discrete computer systems. In order for the applications instances to function symmetrically within the distributed application, the application instances share a common application configuration. The common configuration is maintained by an application-configuration synchronization subsystem that propagates configuration changes and that monitors the individual configurations of the application instances to ensure that they correspond to one another.

20 Claims, 34 Drawing Sheets

(56) References Cited

U.S. PATENT DOCUMENTS

| | | | |
|---|---|---|---|
| 2010/0043015 A1* | 2/2010 | McClements | G06F 9/44505 |
| | | | 719/316 |
| 2013/0054962 A1* | 2/2013 | Chawla | H04L 9/321 |
| | | | 713/156 |
| 2013/0117831 A1* | 5/2013 | Hook | G06F 21/335 |
| | | | 726/6 |
| 2013/0124807 A1* | 5/2013 | Nielsen | G06F 11/1438 |
| | | | 711/162 |
| 2015/0193515 A1* | 7/2015 | Thyagarajan | G06F 16/27 |
| | | | 707/610 |
| 2016/0020947 A1* | 1/2016 | Jalan | H04L 67/34 |
| | | | 709/222 |
| 2016/0092463 A1* | 3/2016 | Vijayan | G06F 3/0665 |
| | | | 707/626 |
| 2016/0277525 A1* | 9/2016 | Porat | G06F 8/36 |
| 2016/0308721 A1* | 10/2016 | Dellisanti | H04L 69/28 |
| 2016/0328222 A1* | 11/2016 | Arumugam | G06F 8/61 |
| 2017/0366637 A1* | 12/2017 | Bandyopadhyay | H04L 67/2842 |
| 2018/0048532 A1* | 2/2018 | Poort | H04L 41/147 |
| 2018/0060059 A1* | 3/2018 | Wang | G06F 16/22 |
| 2018/0176023 A1* | 6/2018 | Prickett | H04L 9/3268 |
| 2018/0285353 A1* | 10/2018 | Ramohalli Gopala Rao | G06F 9/45558 |
| 2019/0026129 A1* | 1/2019 | Matei | G06F 9/44 |

\* cited by examiner

| | | | |
|---|---|---|---|
| 1402 | Start Workflow | The starting point of the workflow. All workflows contain this element. A workflow can have only one start element. Start elements have one output and no input, and cannot be removed from the workflow schema. |  |
| 1408 | Scriptable task | General purpose tasks you define. You write JavaScript functions in this element. |  |
| 1406 | Decision | A boolean function. Decision elements take one input parameters and return either true or false. The type of decision that the element mtakes depends on the type of the input parameter. Decision elements let the workflow branch into different directions, depending on the input parameter the decision element receives. If the received input parameter corresponds to an exepected value, the workflow continues along a certain route. If the input is not the expected value, the workflow continues on an alaternative path. |  |
| 1407 | Custom decision | A boolean function. Custom decisions can take several input parameters and process them according to custom scripts. Returns either true or false. |  |
| | Decision activity | A boolean function. A decision activity runs a workflow and binds its output parameters to a true or false path. |  |
| 1410 | User interaction | Lets users pass new input parameters to the workflow. You can design how the user interaction element presents the request for input parameters and place constraints on the parameters that users can provide. You can set permissions to determine which users can provide the input parameters. When a running workflow arrives at a user interaction element, it enters a passive state and prompts the user for input. You can set a timeout period within which the users must provide input. The workflow resumes according to the data the user passes to it, or returns an exception if the timeout period expires. While it is waiting for the user to respond, the workflow token is in the waiting. |  |
| 1412 | Waiting timer | Used by long-running workflows. When a running workflow arrives at a Waiting Timer element, it enters a passive state. You set an abosoulte date at which the workflow resumes running. While it is waiting for the date, the workflow token is in the waiting-signal state. |  |
| 1413 | Waiting event | Used in long-running workflows. When a running workflow arrives at a Waiting Event element, it enters a passive state. You define a trigger event that the workflow awaits before it resumes running. While it is waiting for the event, the workflow token is in the waiting-signal state. |  |
| 1404 | End workflow | The end point of a workflow. You can have multiple end elements in a schema, to represent the various possible outcomes of the workflow. End elements have one input with no output. When a workflow reaches an End Workflow element, the workflow token enters the completed state. |  |

FIG. 14A

| Label | Name | Description | |
|---|---|---|---|
| 1414 | Thrown exception | Creates an exception and stops the workflow. Multiple occurrences of this element can be present in the workflow schema. Exception elements have one input parameters, which can only be of the String type, and have no output parameter. When a workflow reaches an Exception element, the workflow token enters the failed state. | |
| 1426 | Workflow note | Lets you annotate sections of the workflow. You can stretch notes to delineate sections of the workflow. You can change the background color to the notes to differentiate workflow zones. Workflow notes provide only visual information, to help you understand the schema. | |
| 1424 | Action element | Calls on an action from the Orchestrator libraries of action. When a workflow reaches an action element, it calls and runs that action. | |
| 1422 | Workflow element | Starts another workflow synchronously. When a workflow reaches a Workflow element in its schema, it runs that workflow as part of its onwn process. The original workflow continues only after the called workflow completes its run. | |
| 1420 | Foreach element | Runs a workflow on every element from an array. For example, you can run the Rename Virtual Machine workflow on all virtual machines from a folder. | |
| 1423 | Asynchronous workflow | Starts a workflow asynchronously. When a workflow reaches an asynchronous workflow element, it starts that workflow and continues its own run. The original workflow does not wait for the called workflow to complete. | |
| 1428 | Schedule workflow | Create a task to run the workflow at a set time, and then the workflow continues its run. | |
| 1429 | Nested workflows | Starts several workflows simultaneously. You can choose to nest local workflows and remote workflows that are in a different Orchestrator server. You can also run workflows with different credentials. The workflow waits for all the nested workflows to complete before continuing its run. | |
| 1415 | Handle error | Handles an error for a specific workflow element. The workflow can handle the error by creating an exception, calling another workflow, or running a custom script. | |
| 1416 | Default error handler | Handles workflow errors that are not caught by standard error handlers. You can use any available scheme elements to handle errors. | |
| 1418 | Switch | Switches to alternative workflow paths, based on workflow attribute or parameter. | |

FIG. 14B

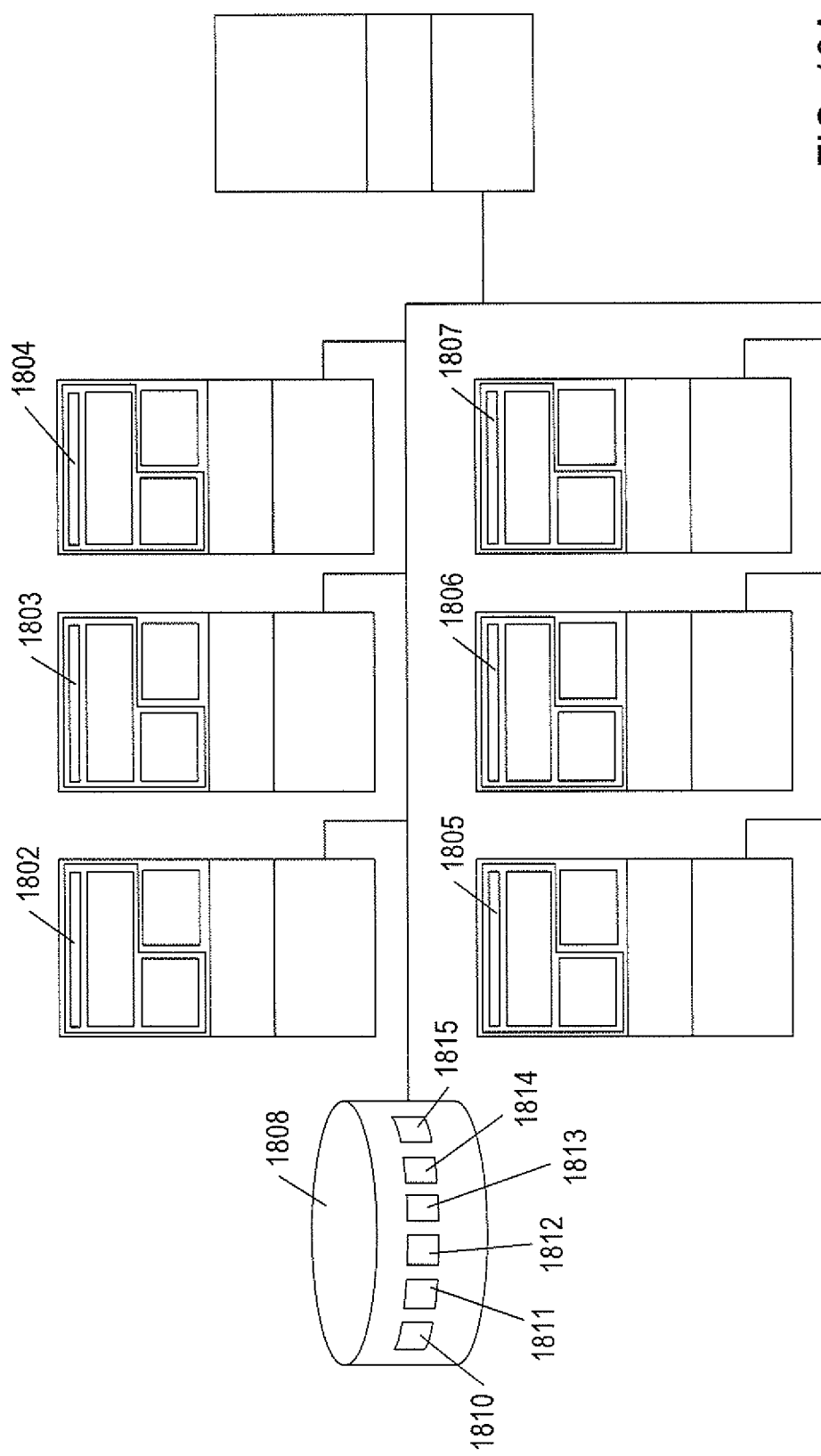

METHODS AND SYSTEMS THAT SYNCHRONIZE CONFIGURATION OF A CLUSTERED APPLICATION

TECHNICAL FIELD

The current document is directed to distributed applications and, in particular, to a distributed application in which a common configuration is maintained for each application instance.

BACKGROUND

Early computer systems were generally large, single-processor systems that sequentially executed jobs encoded on huge decks of Hollerith cards. Over time, the parallel evolution of computer hardware and software produced main-frame computers and minicomputers with multi-tasking operation systems, increasingly capable personal computers, workstations, and servers, and, in the current environment, multi-processor mobile computing devices, personal computers, and servers interconnected through global networking and communications systems with one another and with massive virtual data centers and virtualized cloud-computing facilities. This rapid evolution of computer systems has been accompanied with greatly expanded needs for computer-system management and administration. Currently, these needs have begun to be addressed by highly capable automated management and administration tools and facilities. As with many other types of computational systems and facilities, from operating systems to applications, many different types of automated administration and management facilities have emerged, providing many different products with overlapping functionalities, but each also providing unique functionalities and capabilities. Owners, managers, and users of large-scale computer systems continue to seek methods and technologies to provide efficient and cost-effective management and administration of, and development of applications within, cloud-computing facilities and other large-scale computer systems.

SUMMARY

The current document is directed a distributed application in which a common configuration is maintained across the applications instances. In a disclosed example, a workflow-development-and-process-automation application is distributed across multiple discrete computer systems. In order for the applications instances to function symmetrically within the distributed application, the application instances share a common application configuration. The common configuration is maintained by an application-configuration synchronization subsystem that propagates configuration changes and that monitors the individual configurations of the application instances to ensure that they correspond to one another.

BRIEF DESCRIPTION OF THE DRAWINGS

FIGS. 14A-B include a table of different types of elements that may be included in a workflow.

FIGS. 18A-C illustrate additions to the single-server-resident non-distributed WDPAA to facilitate aggregation of WDPAA instances into a distributed WDPAA.

DETAILED DESCRIPTION

The current document is directed to a distributed application in which the application instances share a common application configuration. In a first subsection, below, a detailed description of computer hardware, complex computational systems, and virtualization is provided with reference to FIGS. 1-10. In a second subsection, discussion of a workflow-development-and-process-automation application is provided with reference to FIGS. 11-15B. In a third subsection, methods and subsystems that synchronize application-instance configurations within a distributed workflow-development-and-process-automation application are disclosed.

Computer Hardware, Complex Computational Systems, and Virtualization

Figure 1:
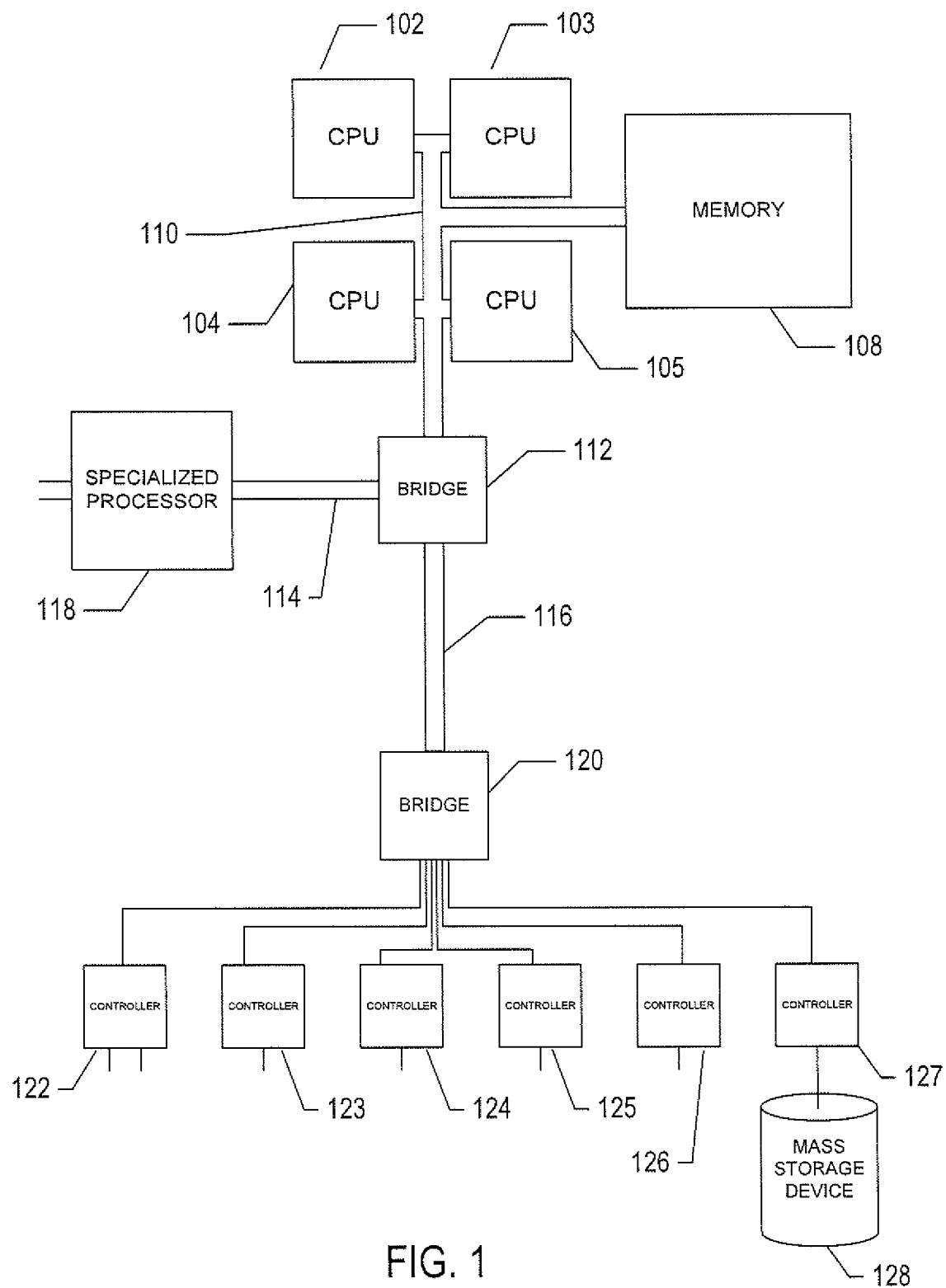
FIG. 1 provides a general architectural diagram for various types of computers.

FIG. 1 provides a general architectural diagram for various types of computers. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/ memory-subsystem bus 110 with additional busses 114 and 116, or other types of high-speed interconnection media, including multiple, high-speed serial interconnects. These busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of mass-storage devices 128, electronic displays, input devices, and other such components, subcomponents, and computational resources. It should be noted that computer-readable data-storage devices include optical and electromagnetic disks, electronic memories, and other physical data-storage devices. Those familiar with modern science and technology appreciate that electromagnetic radiation and propagating signals do not store data for subsequent retrieval, and can transiently "store" only a byte or less of information per mile, far less information than needed to encode even the simplest of routines.

Of course, there are many different types of computer-system architectures that differ from one another in the number of different memories, including different types of hierarchical cache memories, the number of processors and the connectivity of the processors with other system components, the number of internal communications busses and serial links, and in many other ways. However, computer systems generally execute stored programs by fetching instructions from memory and executing the instructions in one or more processors. Computer systems include general-purpose computer systems, such as personal computers ("PCs"), various types of servers and workstations, and higher-end mainframe computers, but may also include a plethora of various types of special-purpose computing devices, including data-storage systems, communications routers, network nodes, tablet computers, and mobile telephones.

Figure 2:
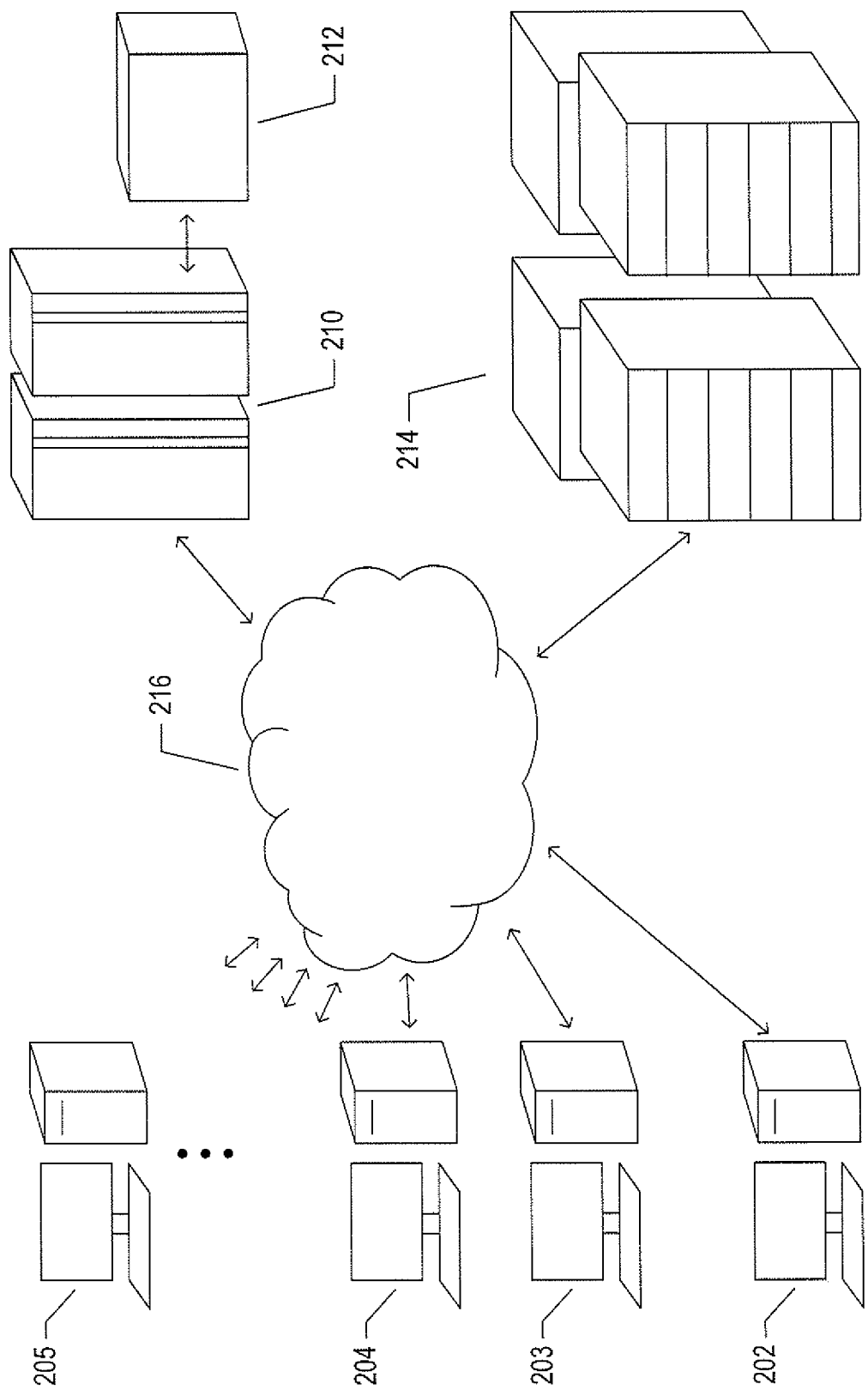
FIG. 2 illustrates an Internet-connected distributed computer system.

FIG. 2 illustrates an Internet-connected distributed computer system. As communications and networking technologies have evolved in capability and accessibility, and as the computational bandwidths, data-storage capacities, and other capabilities and capacities of various types of computer systems have steadily and rapidly increased, much of modern computing now generally involves large distributed systems and computers interconnected by local networks, wide-area networks, wireless communications, and the Internet. FIG. 2 shows a typical distributed system in which a large number of PCs 202-205, a high-end distributed mainframe system 210 with a large data-storage system 212, and a large computer center 214 with large numbers of rack-mounted servers or blade servers all interconnected through various communications and networking systems that together comprise the Internet 216. Such distributed computing systems provide diverse arrays of functionalities. For example, a PC user sitting in a home office may access hundreds of millions of different web sites provided by hundreds of thousands of different web servers throughout the world and may access high-computational-bandwidth computing services from remote computer facilities for running complex computational tasks.

Until recently, computational services were generally provided by computer systems and data centers purchased, configured, managed, and maintained by service-provider organizations. For example, an e-commerce retailer generally purchased, configured, managed, and maintained a data center including numerous web servers, back-end computer systems, and data-storage systems for serving web pages to remote customers, receiving orders through the web-page interface, processing the orders, tracking completed orders, and other myriad different tasks associated with an e-commerce enterprise.

Figure 3:
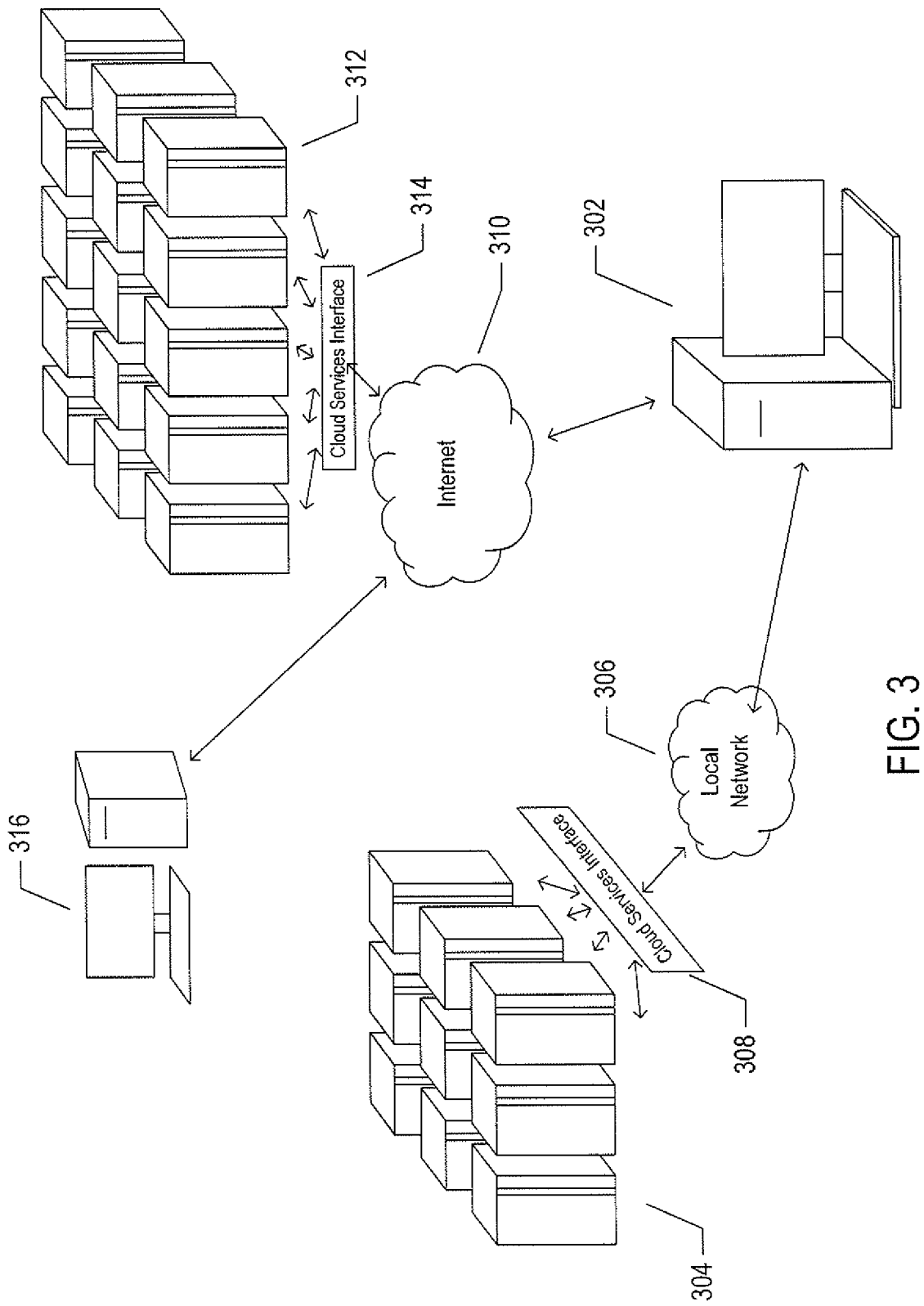
FIG. 3 illustrates cloud computing.

FIG. 3 illustrates cloud computing. In the recently developed cloud-computing paradigm, computing cycles and data-storage facilities are provided to organizations and individuals by cloud-computing providers. In addition, larger organizations may elect to establish private cloud-computing facilities in addition to, or instead of, subscribing to computing services provided by public cloud-computing service providers. In FIG. 3, a system administrator for an organization, using a PC 302, accesses the organization's private cloud 304 through a local network 306 and private-cloud interface 308 and also accesses, through the Internet 310, a public cloud 312 through a public-cloud services interface 314. The administrator can, in either the case of the private cloud 304 or public cloud 312, configure virtual computer systems and even entire virtual data centers and launch execution of application programs on the virtual computer systems and virtual data centers in order to carry out any of many different types of computational tasks. As one example, a small organization may configure and run a virtual data center within a public cloud that executes web servers to provide an e-commerce interface through the public cloud to remote customers of the organization, such as a user viewing the organization's e-commerce web pages on a remote user system 316.

Cloud-computing facilities are intended to provide computational bandwidth and data-storage services much as utility companies provide electrical power and water to consumers. Cloud computing provides enormous advantages to small organizations without the resources to purchase, manage, and maintain in-house data centers. Such organizations can dynamically add and delete virtual computer systems from their virtual data centers within public clouds in order to track computational-bandwidth and data-storage needs, rather than purchasing sufficient computer systems within a physical data center to handle peak computational-bandwidth and data-storage demands. Moreover, small organizations can completely avoid the overhead of maintaining and managing physical computer systems, including hiring and periodically retraining information-technology specialists and continuously paying for operating-system and database-management-system upgrades. Furthermore, cloud-computing interfaces allow for easy and straightforward configuration of virtual computing facilities, flexibility in the types of applications and operating systems that can be configured, and other functionalities that are useful even for owners and administrators of private cloud-computing facilities used by a single organization.

Figure 4:
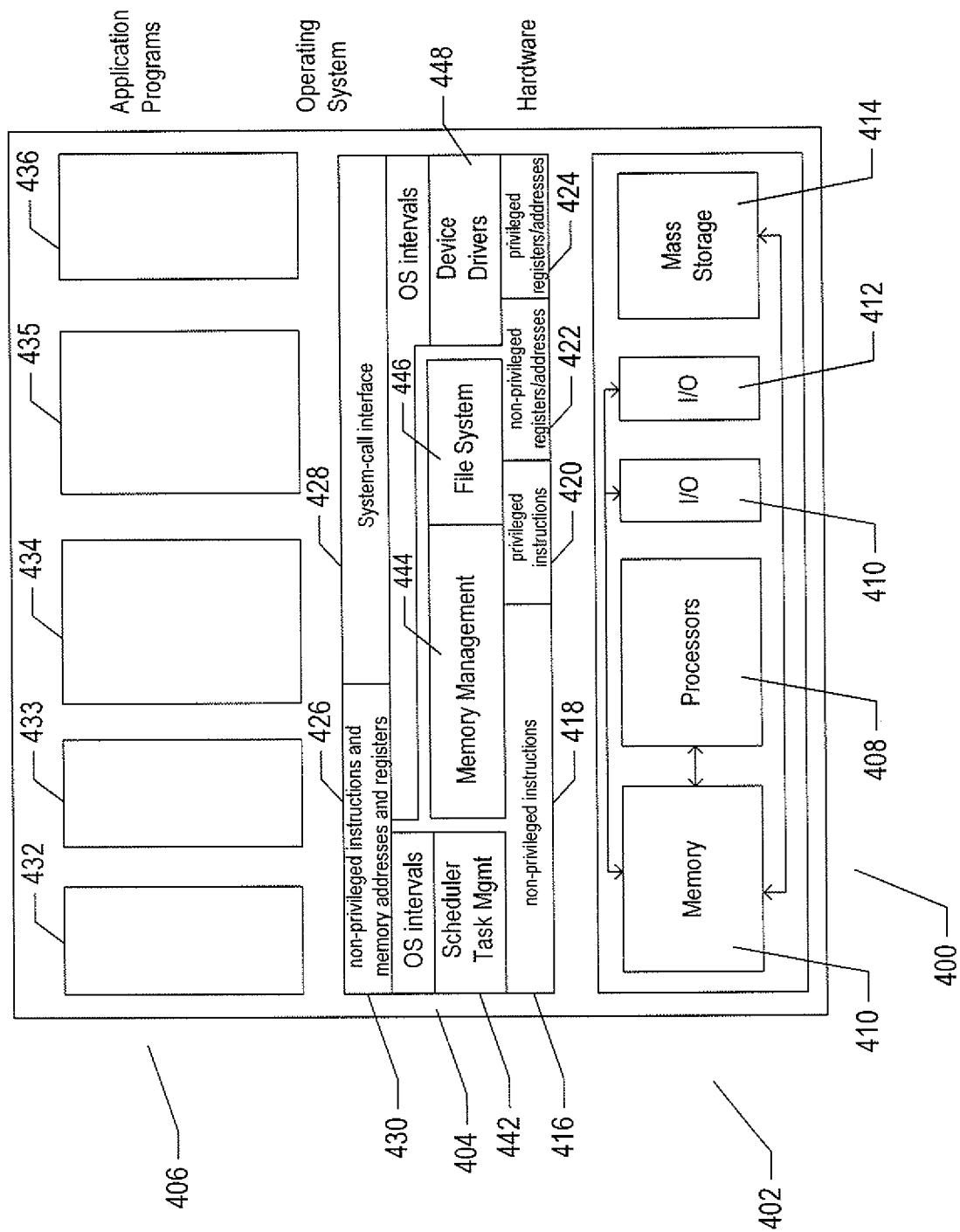
FIG. 4 illustrates generalized hardware and software components of a general-purpose computer system, such as a general-purpose computer system having an architecture similar to that shown in FIG. 1.

FIG. 4 illustrates generalized hardware and software components of a general-purpose computer system, such as a general-purpose computer system having an architecture similar to that shown in FIG. 1. The computer system 400 is often considered to include three fundamental layers: (1) a hardware layer or level 402; (2) an operating-system layer or level 404; and (3) an application-program layer or level 406. The hardware layer 402 includes one or more processors 408, system memory 410, various different types of input-output ("I/O") devices 410 and 412, and mass-storage devices 414. Of course, the hardware level also includes many other components, including power supplies, internal communications links and busses, specialized integrated circuits, many different types of processor-controlled or microprocessor-controlled peripheral devices and controllers, and many other components. The operating system 404 interfaces to the hardware level 402 through a low-level operating system and hardware interface 416 generally comprising a set of non-privileged computer instructions 418, a set of privileged computer instructions 420, a set of non-privileged registers and memory addresses 422, and a set of privileged registers and memory addresses 424. In general, the operating system exposes non-privileged instructions, non-privileged registers, and non-privileged memory addresses 426 and a system-call interface 428 as an operating-system interface 430 to application programs 432-436 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 442, memory management 444, a file system 446, device drivers 448, and many other components and modules. To a certain degree, modern operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of various different application programs and higher-level computational entities, providing to each application program a virtual, stand-alone system devoted entirely to the application program. From the application program's standpoint, the application program executes continuously without concern for the need to share processor resources and other system resources with other application programs and higher-level computational entities. The device drivers abstract details of hardware-component operation, allowing application programs to employ the system-call interface for transmitting and receiving data to and from communications networks, mass-storage devices, and other I/O devices and subsystems. The file system 446 facilitates abstraction of mass-storage-device and memory resources as a high-level, easy-to-access, file-system interface. Thus, the development and evolution of the operating system has resulted in the generation of a type of multi-faceted virtual execution environment for application programs and other higher-level computational entities.

While the execution environments provided by operating systems have proved to be an enormously successful level of abstraction within computer systems, the operating-system-provided level of abstraction is nonetheless associated with difficulties and challenges for developers and users of application programs and other higher-level computational entities. One difficulty arises from the fact that there are many different operating systems that run within various different types of computer hardware. In many cases, popular application programs and computational systems are developed to run on only a subset of the available operating systems, and can therefore be executed within only a subset of the various different types of computer systems on which the operating systems are designed to run. Often, even when an application program or other computational system is ported to additional operating systems, the application program or other computational system can nonetheless run more efficiently on the operating systems for which the application program or other computational system was originally targeted. Another difficulty arises from the increasingly distributed nature of computer systems. Although distributed operating systems are the subject of considerable research and development efforts, many of the popular operating systems are designed primarily for execution on a single computer system. In many cases, it is difficult to move application programs, in real time, between the different computer systems of a distributed computer system for high-availability, fault-tolerance, and load-balancing purposes. The problems are even greater in heterogeneous distributed computer systems which include different types of hardware and devices running different types of operating systems. Operating systems continue to evolve, as a result of which certain older application programs and other computational entities may be incompatible with more recent versions of operating systems for which they are targeted, creating compatibility issues that are particularly difficult to manage in large distributed systems.

Figure 5A:
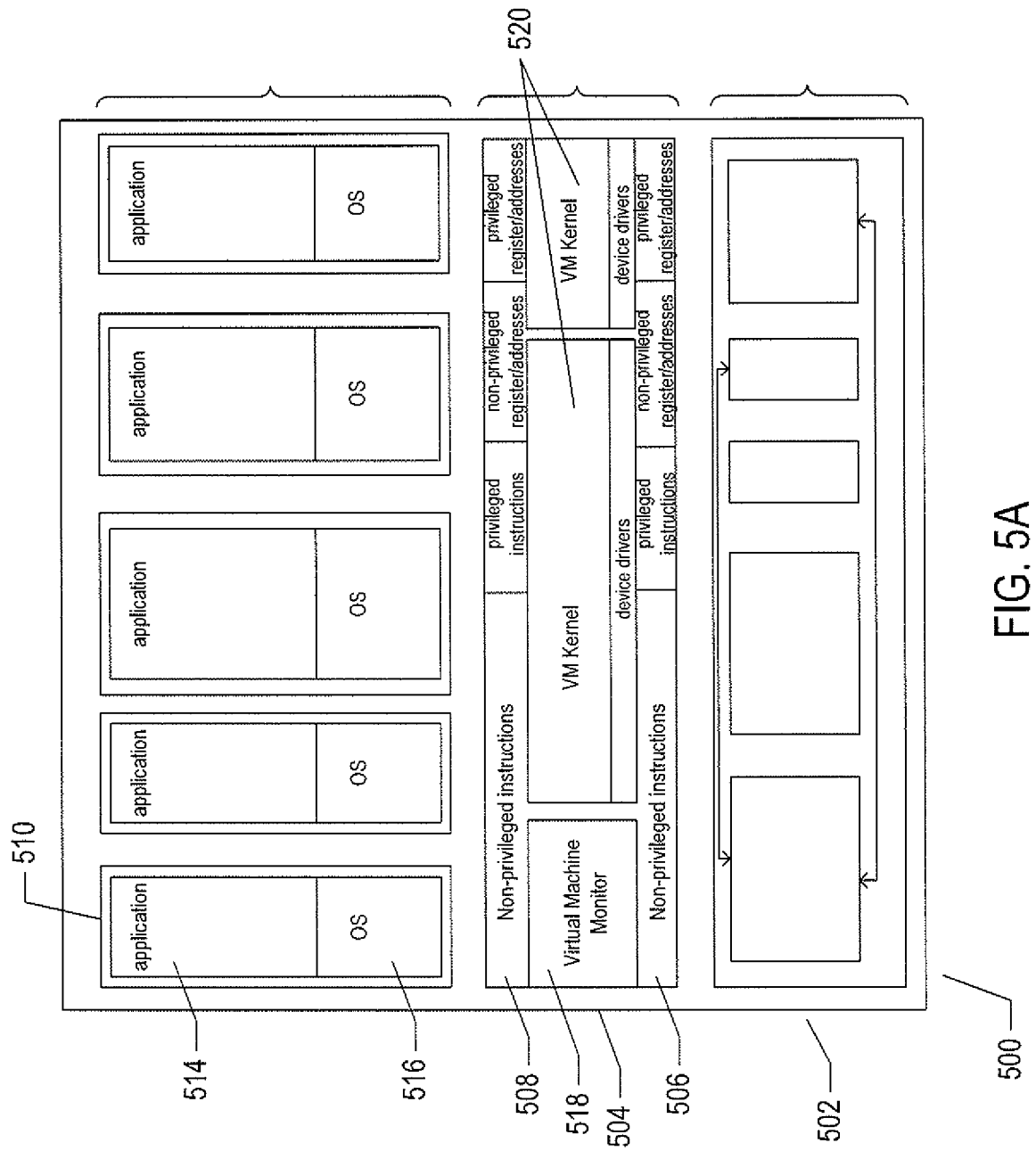
FIGS. 5A-D illustrate several types of virtual machine and virtual-machine execution environments.
Figure 5B:
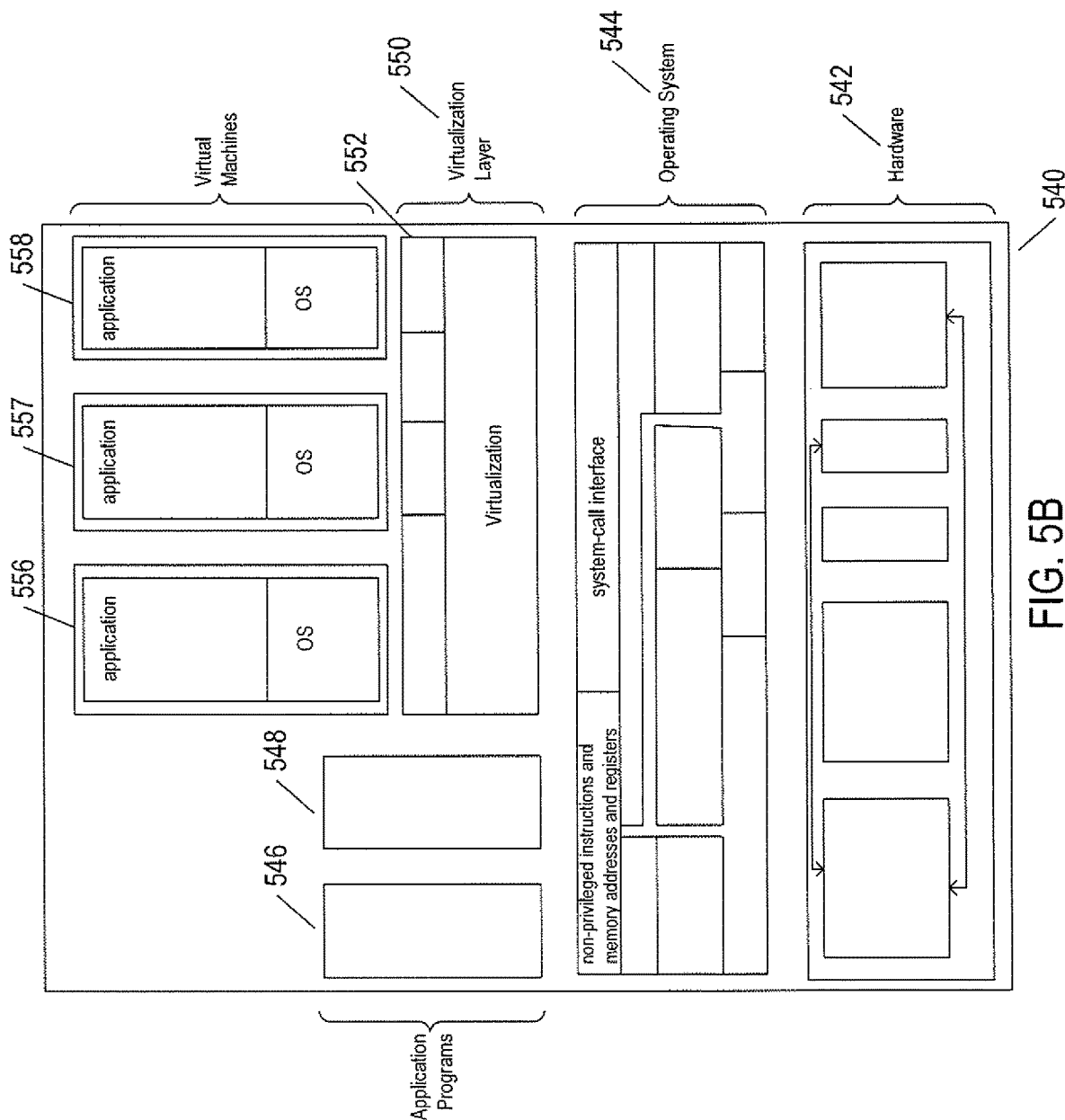

For all of these reasons, a higher level of abstraction, referred to as the "virtual machine," has been developed and evolved to further abstract computer hardware in order to address many difficulties and challenges associated with traditional computing systems, including the compatibility issues discussed above. FIGS. 5A-D illustrate several types of virtual machine and virtual-machine execution environments. FIGS. 5A-B use the same illustration conventions as used in FIG. 4. FIG. 5A shows a first type of virtualization. The computer system 500 in FIG. 5A includes the same hardware layer 502 as the hardware layer 402 shown in FIG. 4. However, rather than providing an operating system layer directly above the hardware layer, as in FIG. 4, the virtualized computing environment illustrated in FIG. 5A features a virtualization layer 504 that interfaces through a virtualization-layer/hardware-layer interface 506, equivalent to interface 416 in FIG. 4, to the hardware. The virtualization layer provides a hardware-like interface 508 to a number of virtual machines, such as virtual machine 510, executing above the virtualization layer in a virtual-machine layer 512. Each virtual machine includes one or more application programs or other higher-level computational entities packaged together with an operating system, referred to as a "guest operating system," such as application 514 and guest operating system 516 packaged together within virtual machine 510. Each virtual machine is thus equivalent to the operating-system layer 404 and application-program layer 406 in the general-purpose computer system shown in FIG. 4. Each guest operating system within a virtual machine interfaces to the virtualization-layer interface 508 rather than to the actual hardware interface 506. The virtualization layer partitions hardware resources into abstract virtual-hardware layers to which each guest operating system within a virtual machine interfaces. The guest operating systems within the virtual machines, in general, are unaware of the virtualization layer and operate as if they were directly accessing a true hardware interface. The virtualization layer ensures that each of the virtual machines currently executing within the virtual environment receive a fair allocation of underlying hardware resources and that all virtual machines receive sufficient resources to progress in execution. The virtualization-layer interface 508 may differ for different guest operating systems. For example, the virtualization layer is generally able to provide virtual hardware interfaces for a variety of different types of computer hardware. This allows, as one example, a virtual machine that includes a guest operating system designed for a particular computer architecture to run on hardware of a different architecture. The number of virtual machines need not be equal to the number of physical processors or even a multiple of the number of processors.

The virtualization layer includes a virtual-machine-monitor module 518 ("VMM") that virtualizes physical processors in the hardware layer to create virtual processors on which each of the virtual machines executes. For execution efficiency, the virtualization layer attempts to allow virtual machines to directly execute non-privileged instructions and to directly access non-privileged registers and memory. However, when the guest operating system within a virtual machine accesses virtual privileged instructions, virtual privileged registers, and virtual privileged memory through the virtualization-layer interface 508, the accesses result in execution of virtualization-layer code to simulate or emulate the privileged resources. The virtualization layer additionally includes a kernel module 520 that manages memory, communications, and data-storage machine resources on behalf of executing virtual machines ("VM kernel"). The VM kernel, for example, maintains shadow page tables on each virtual machine so that hardware-level virtual-memory facilities can be used to process memory accesses. The VM kernel additionally includes routines that implement virtual communications and data-storage devices as well as device drivers that directly control the operation of underlying hardware communications and data-storage devices. Similarly, the VM kernel virtualizes various other types of I/O devices, including keyboards, optical-disk drives, and other such devices. The virtualization layer essentially schedules execution of virtual machines much like an operating system schedules execution of application programs, so that the virtual machines each execute within a complete and fully functional virtual hardware layer.

FIG. 5B illustrates a second type of virtualization. In FIG. 5B, the computer system 540 includes the same hardware layer 542 and software layer 544 as the hardware layer 402 shown in FIG. 4. Several application programs 546 and 548 are shown running in the execution environment provided by the operating system. In addition, a virtualization layer 550 is also provided, in computer 540, but, unlike the virtualization layer 504 discussed with reference to FIG. 5A, virtualization layer 550 is layered above the operating system 544, referred to as the "host OS," and uses the operating system interface to access operating-system-provided functionality as well as the hardware. The virtualization layer 550 comprises primarily a VMM and a hardware-like interface 552, similar to hardware-like interface 508 in FIG. 5A. The virtualization-layer/hardware-layer interface 552, equivalent to interface 416 in FIG. 4, provides an execution environment for a number of virtual machines 556-558, each including one or more application programs or other higher-level computational entities packaged together with a guest operating system.

Figure 5C:
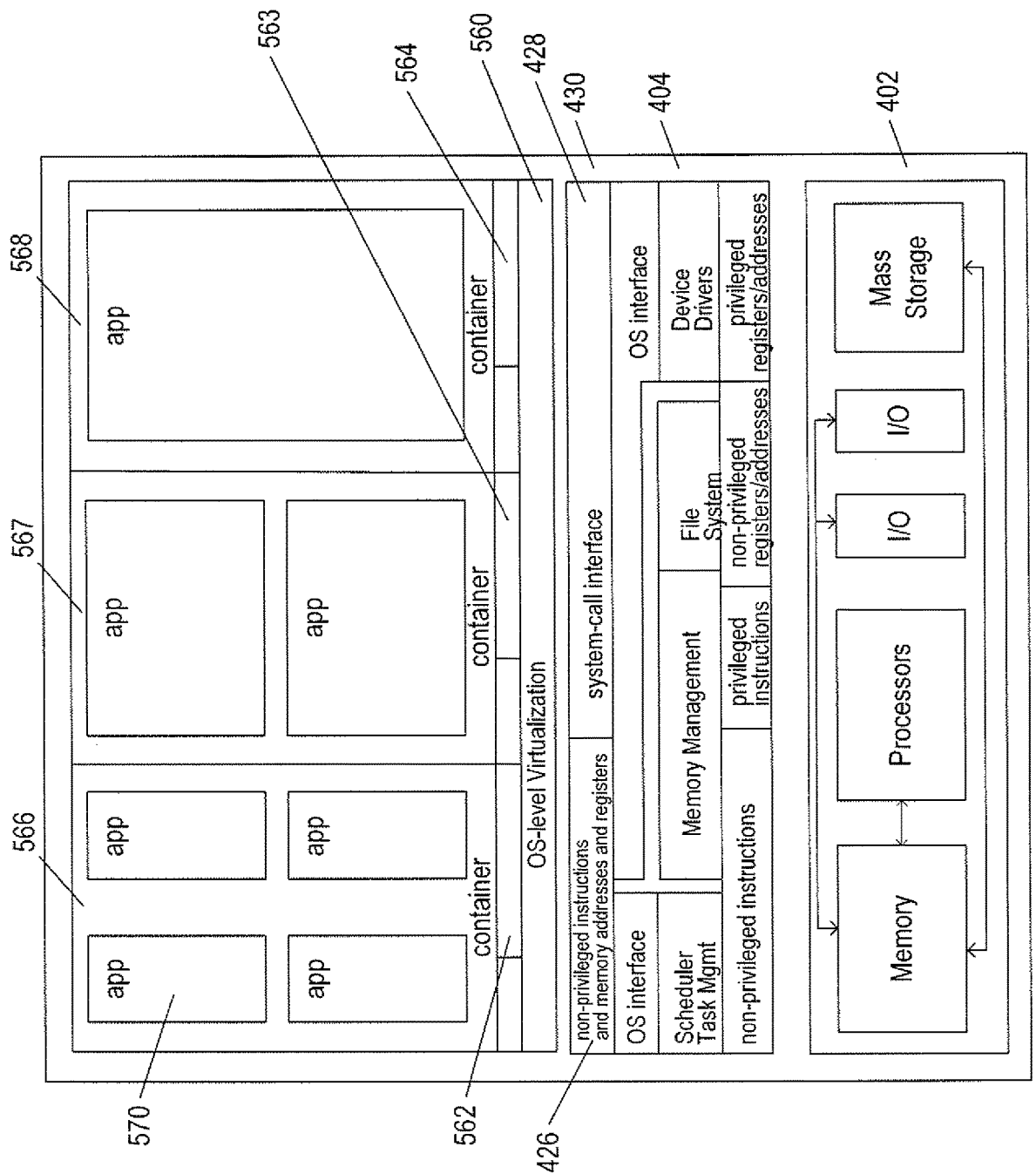

While the traditional virtual-machine-based virtualization layers, described with reference to FIGS. 5A-B, have enjoyed widespread adoption and use in a variety of different environments, from personal computers to enormous distributed computing systems, traditional virtualization technologies are associated with computational overheads. While these computational overheads have been steadily decreased, over the years, and often represent ten percent or less of the total computational bandwidth consumed by an application running in a virtualized environment, traditional virtualization technologies nonetheless involve computational costs in return for the power and flexibility that they provide. Another approach to virtualization is referred to as operating-system-level virtualization ("OSL virtualization"). FIG. 5C illustrates the OSL-virtualization approach. In FIG. 5C, as in previously discussed FIG. 4, an operating system 404 runs above the hardware 402 of a host computer. The operating system provides an interface for higher-level computational entities, the interface including a system-call interface 428 and exposure to the non-privileged instructions and memory addresses and registers 426 of the hardware layer 402. However, unlike in FIG. 5A, rather than applications running directly above the operating system, OSL virtualization involves an OS-level virtualization layer 560 that provides an operating-system interface 562-564 to each of one or more containers 566-568. The containers, in turn, provide an execution environment for one or more applications, such as application 570 running within the execution environment provided by container 566. The container can be thought of as a partition of the resources generally available to higher-level computational entities through the operating system interface 430. While a traditional virtualization layer can simulate the hardware interface expected by any of many different operating systems, OSL virtualization essentially provides a secure partition of the execution environment provided by a particular operating system. As one example, OSL virtualization provides a file system to each container, but the file system provided to the container is essentially a view of a partition of the general file system provided by the underlying operating system. In essence, OSL virtualization uses operating-system features, such as name space support, to isolate each container from the remaining containers so that the applications executing within the execution environment provided by a container are isolated from applications executing within the execution environments provided by all other containers. As a result, a container can be booted up much faster than a virtual machine, since the container uses operating-system-kernel features that are already available within the host computer. Furthermore, the containers share computational bandwidth, memory, network bandwidth, and other computational resources provided by the operating system, without resource overhead allocated to virtual machines and virtualization layers. Again, however, OSL virtualization does not provide many desirable features of traditional virtualization. As mentioned above, OSL virtualization does not provide a way to run different types of operating systems for different groups of containers within the same host system, nor does OSL-virtualization provide for live migration of containers between host computers, as does traditional virtualization technologies.

Figure 5D:
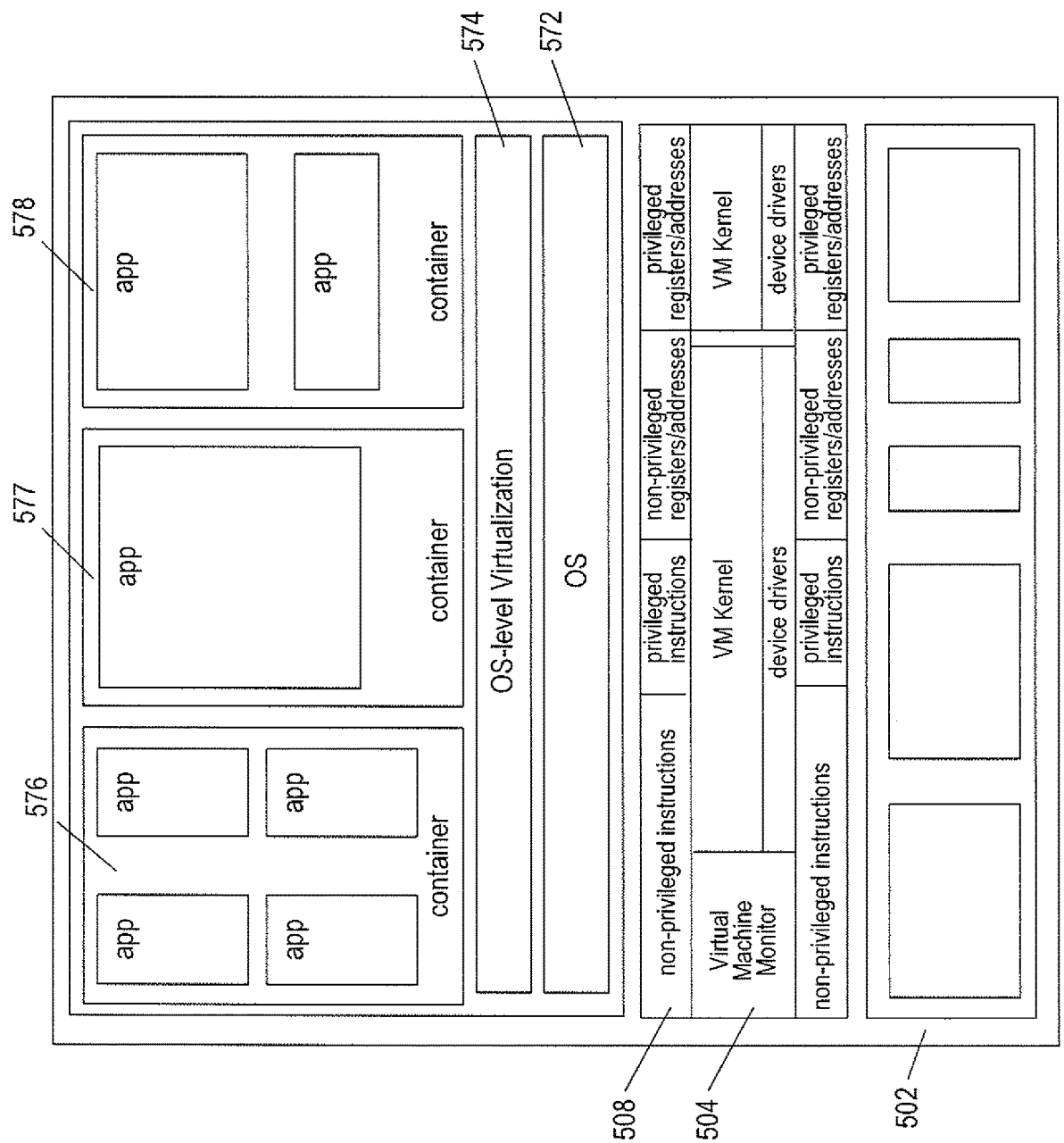

FIG. 5D illustrates an approach to combining the power and flexibility of traditional virtualization with the advantages of OSL virtualization. FIG. 5D shows a host computer similar to that shown in FIG. 5A, discussed above. The host computer includes a hardware layer 502 and a virtualization layer 504 that provides a simulated hardware interface 508 to an operating system 572. Unlike in FIG. 5A, the operating system interfaces to an OSL-virtualization layer 574 that provides container execution environments 576-578 to multiple application programs. Running containers above a guest operating system within a virtualized host computer provides many of the advantages of traditional virtualization and OSL virtualization. Containers can be quickly booted in order to provide additional execution environments and associated resources to new applications. The resources available to the guest operating system are efficiently partitioned among the containers provided by the OSL-virtualization layer 574. Many of the powerful and flexible features of the traditional virtualization technology can be applied to containers running above guest operating systems including live migration from one host computer to another, various types of high-availability and distributed resource sharing, and other such features. Containers provide share-based allocation of computational resources to groups of applications with guaranteed isolation of applications in one container from applications in the remaining containers executing above a guest operating system. Moreover, resource allocation can be modified at run time between containers. The traditional virtualization layer provides flexible and easy scaling and a simple approach to operating-system upgrades and patches. Thus, the use of OSL virtualization above traditional virtualization, as illustrated in FIG. 5D, provides much of the advantages of both a traditional virtualization layer and the advantages of OSL virtualization. Note that, although only a single guest operating system and OSL virtualization layer as shown in FIG. 5D, a single virtualized host system can run multiple different guest operating systems within multiple virtual machines, each of which supports one or more containers.

Figure 6:
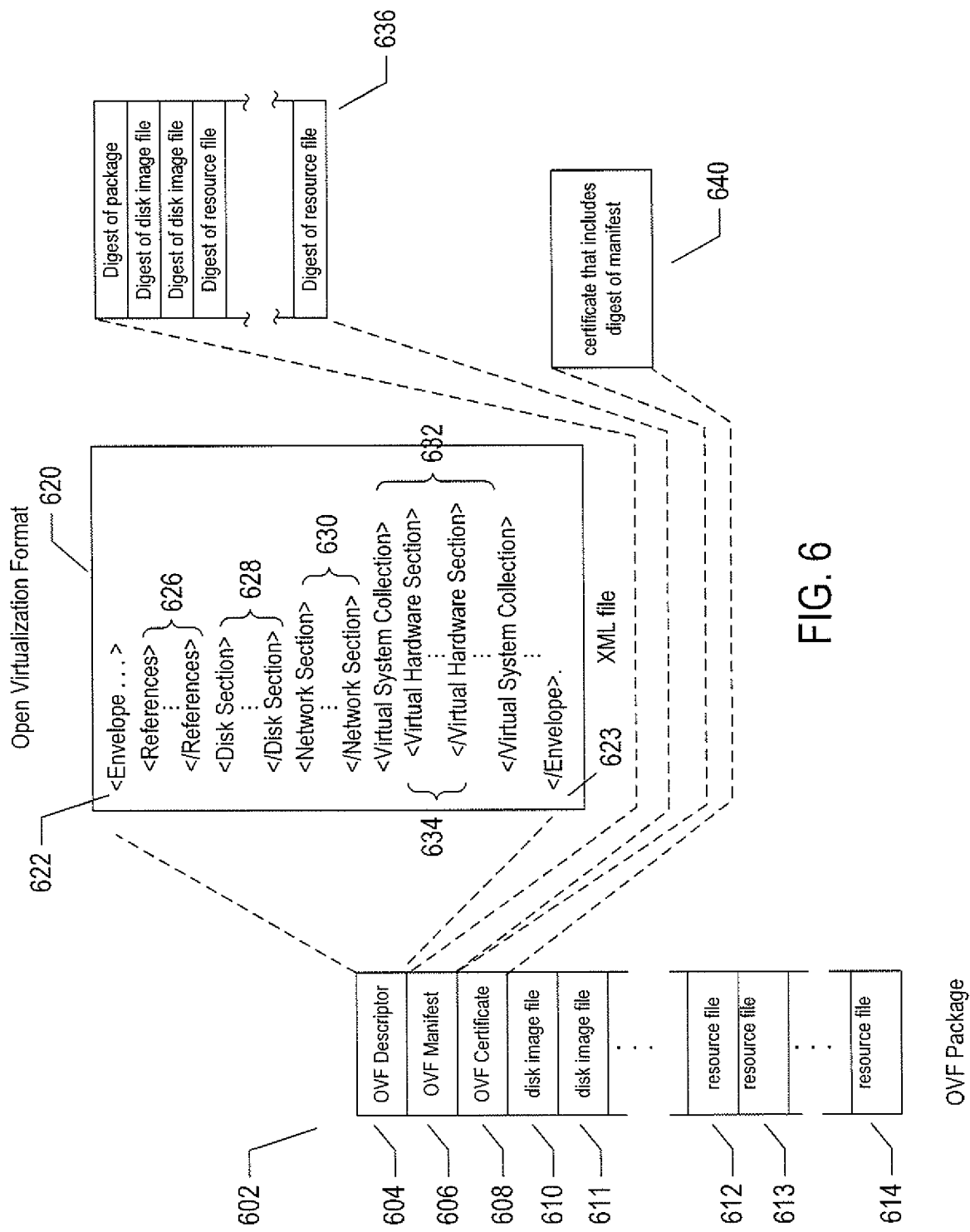
FIG. 6 illustrates an OVF package.

A virtual machine or virtual application, described below, is encapsulated within a data package for transmission, distribution, and loading into a virtual-execution environment. One public standard for virtual-machine encapsulation is referred to as the "open virtualization format" ("OVF"). The OVF standard specifies a format for digitally encoding a virtual machine within one or more data files. FIG. 6 illustrates an OVF package. An OVF package 602 includes an OVF descriptor 604, an OVF manifest 606, an OVF certificate 608, one or more disk-image files 610-611, and one or more resource files 612-614. The OVF package can be encoded and stored as a single file or as a set of files. The OVF descriptor 604 is an XML document 620 that includes a hierarchical set of elements, each demarcated by a beginning tag and an ending tag. The outermost, or highest-level, element is the envelope element, demarcated by tags 622 and 623. The next-level element includes a reference element 626 that includes references to all files that are part of the OVF package, a disk section 628 that contains meta information about all of the virtual disks included in the OVF package, a networks section 630 that includes meta information about all of the logical networks included in the OVF package, and a collection of virtual-machine configurations 632 which further includes hardware descriptions of each virtual machine 634. There are many additional hierarchical levels and elements within a typical OVF descriptor. The OVF descriptor is thus a self-describing XML file that describes the contents of an OVF package. The OVF manifest 606 is a list of cryptographic-hash-function-generated digests 636 of the entire OVF package and of the various components of the OVF package. The OVF certificate 608 is an authentication certificate 640 that includes a digest of the manifest and that is cryptographically signed. Disk image files, such as disk image file 610, are digital encodings of the contents of virtual disks and resource files 612 are digitally encoded content, such as operating-system images. A virtual machine or a collection of virtual machines encapsulated together within a virtual application can thus be digitally encoded as one or more files within an OVF package that can be transmitted, distributed, and loaded using well-known tools for transmitting, distributing, and loading files. A virtual appliance is a software service that is delivered as a complete software stack installed within one or more virtual machines that is encoded within an OVF package.

Figure 7:
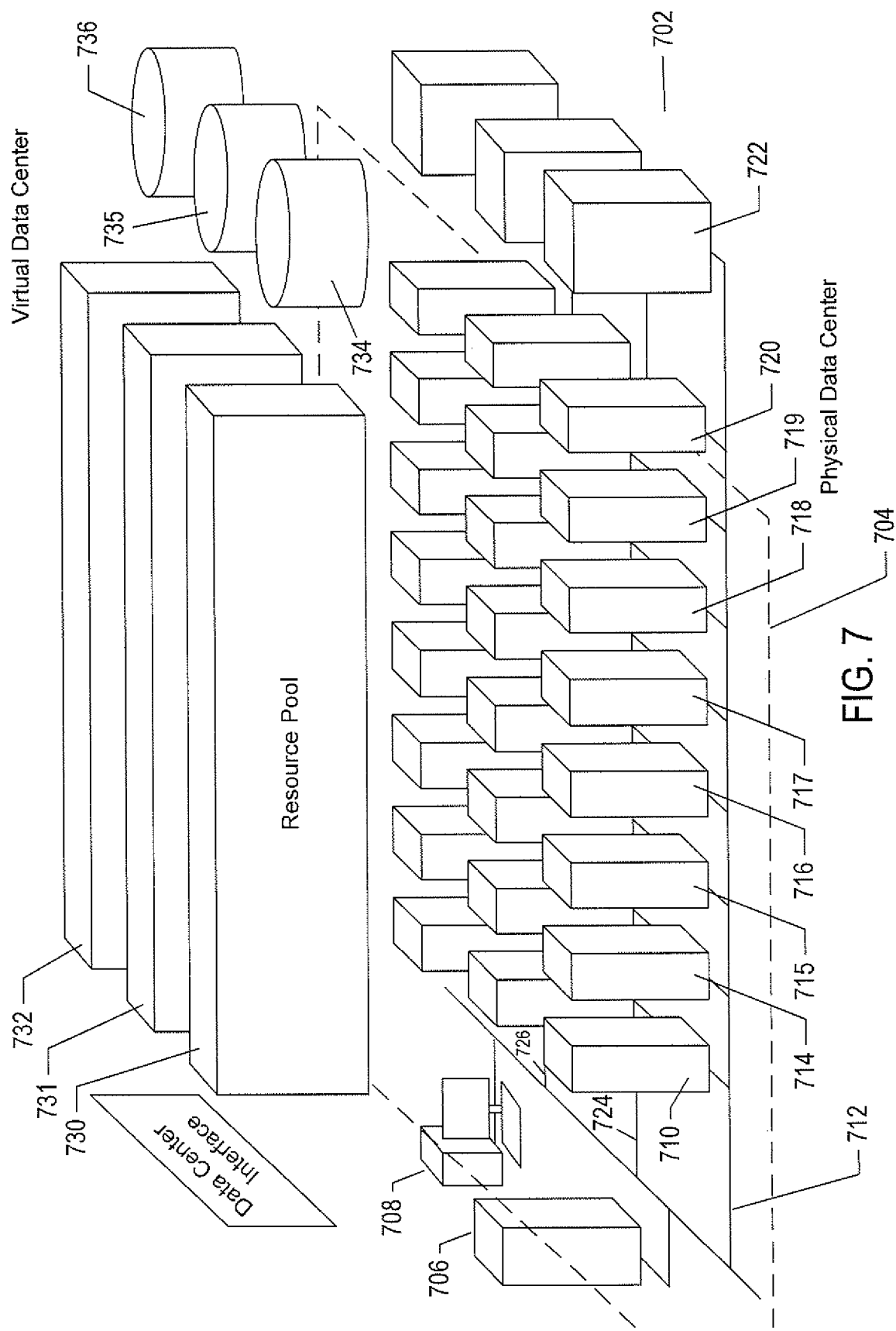
FIG. 7 illustrates virtual data centers provided as an abstraction of underlying physical-data-center hardware components.

The advent of virtual machines and virtual environments has alleviated many of the difficulties and challenges associated with traditional general-purpose computing. Machine and operating-system dependencies can be significantly reduced or entirely eliminated by packaging applications and operating systems together as virtual machines and virtual appliances that execute within virtual environments provided by virtualization layers running on many different types of computer hardware. A next level of abstraction, referred to as virtual data centers which are one example of a broader virtual-infrastructure category, provide a data-center interface to virtual data centers computationally constructed within physical data centers. FIG. 7 illustrates virtual data centers provided as an abstraction of underlying physical-data-center hardware components. In FIG. 7, a physical data center 702 is shown below a virtual-interface plane 704. The physical data center consists of a virtual-infrastructure management server ("VI-management-server") 706 and any of various different computers, such as PCs 708, on which a virtual-data-center management interface may be displayed to system administrators and other users. The physical data center additionally includes generally large numbers of server computers, such as server computer 710, that are coupled together by local area networks, such as local area network 712 that directly interconnects server computer 710 and 714-720 and a mass-storage array 722. The physical data center shown in FIG. 7 includes three local area networks 712, 724, and 726 that each directly interconnects a bank of eight servers and a mass-storage array. The individual server computers, such as server computer 710, each includes a virtualization layer and runs multiple virtual machines. Different physical data centers may include many different types of computers, networks, data-storage systems and devices connected according to many different types of connection topologies. The virtual-data-center abstraction layer 704, a logical abstraction layer shown by a plane in FIG. 7, abstracts the physical data center to a virtual data center comprising one or more resource pools, such as resource pools 730-732, one or more virtual data stores, such as virtual data stores 734-736, and one or more virtual networks. In certain implementations, the resource pools abstract banks of physical servers directly interconnected by a local area network.

The virtual-data-center management interface allows provisioning and launching of virtual machines with respect to resource pools, virtual data stores, and virtual networks, so that virtual-data-center administrators need not be concerned with the identities of physical-data-center components used to execute particular virtual machines. Furthermore, the VI-management-server includes functionality to migrate running virtual machines from one physical server to another in order to optimally or near optimally manage resource allocation, provide fault tolerance, and high availability by migrating virtual machines to most effectively utilize underlying physical hardware resources, to replace virtual machines disabled by physical hardware problems and failures, and to ensure that multiple virtual machines supporting a high-availability virtual appliance are executing on multiple physical computer systems so that the services provided by the virtual appliance are continuously accessible, even when one of the multiple virtual appliances becomes compute bound, data-access bound, suspends execution, or fails. Thus, the virtual data center layer of abstraction provides a virtual-data-center abstraction of physical data centers to simplify provisioning, launching, and maintenance of virtual machines and virtual appliances as well as to provide high-level, distributed functionalities that involve pooling the resources of individual physical servers and migrating virtual machines among physical servers to achieve load balancing, fault tolerance, and high availability.

Figure 8:
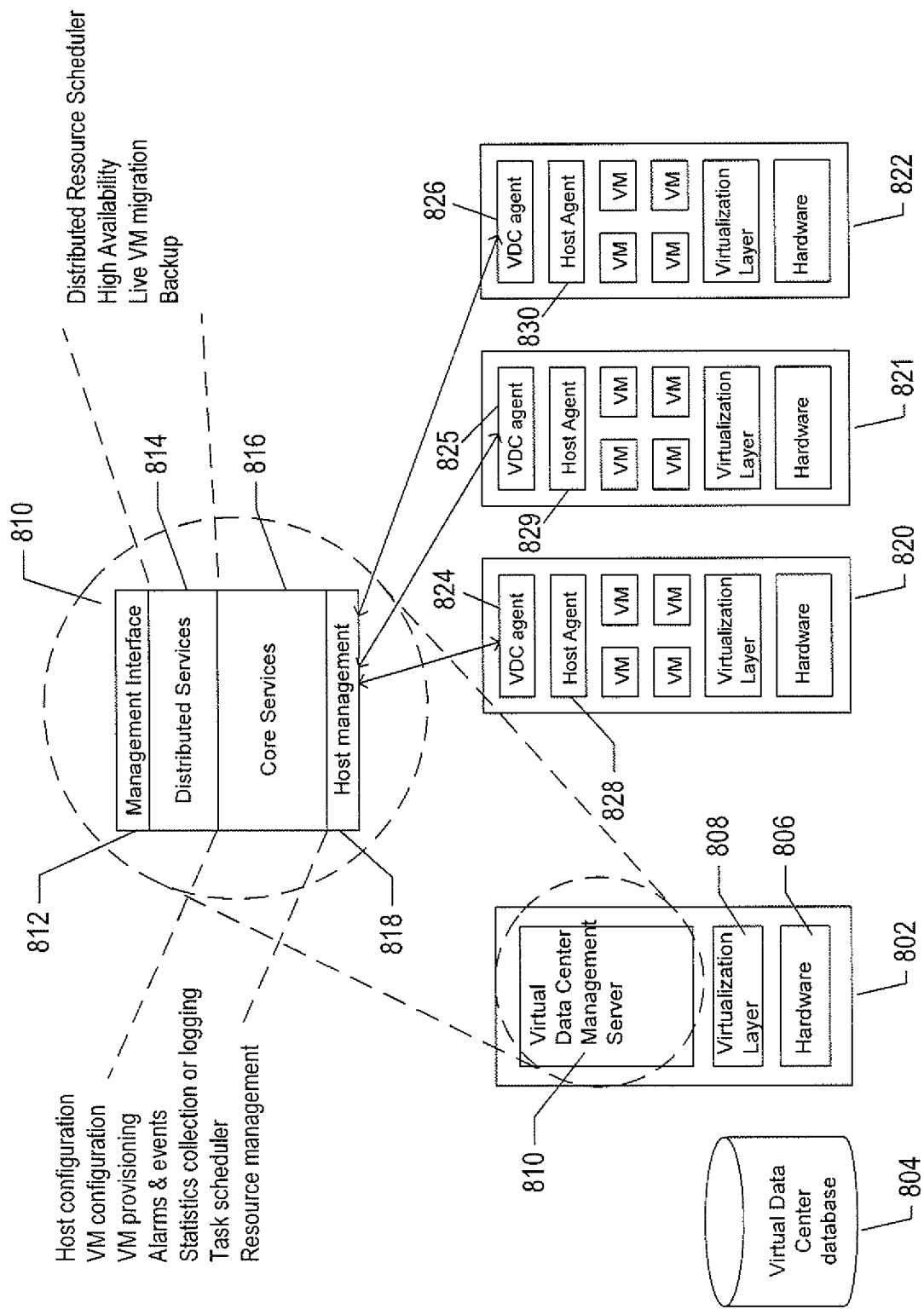
FIG. 8 illustrates virtual-machine components of a VI-management-server and physical servers of a physical data center above which a virtual-data-center interface is provided by the VI-management-server.

FIG. 8 illustrates virtual-machine components of a VI-management-server and physical servers of a physical data center above which a virtual-data-center interface is provided by the VI-management-server. The VI-management-server 802 and a virtual-data-center database 804 comprise the physical components of the management component of the virtual data center. The VI-management-server 802 includes a hardware layer 806 and virtualization layer 808, and runs a virtual-data-center management-server virtual machine 810 above the virtualization layer. Although shown as a single server in FIG. 8, the VI-management-server ("VI management server") may include two or more physical server computers that support multiple VI-management-server virtual appliances. The virtual machine 810 includes a management-interface component 812, distributed services 814, core services 816, and a host-management interface 818. The management interface is accessed from any of various computers, such as the PC 708 shown in FIG. 7. The management interface allows the virtual-data-center administrator to configure a virtual data center, provision virtual machines, collect statistics and view log files for the virtual data center, and to carry out other, similar management tasks. The host-management interface 818 interfaces to virtual-data-center agents 824, 825, and 826 that execute as virtual machines within each of the physical servers of the physical data center that is abstracted to a virtual data center by the VI management server.

The distributed services 814 include a distributed-resource scheduler that assigns virtual machines to execute within particular physical servers and that migrates virtual machines in order to most effectively make use of computational bandwidths, data-storage capacities, and network capacities of the physical data center. The distributed services further include a high-availability service that replicates and migrates virtual machines in order to ensure that virtual machines continue to execute despite problems and failures experienced by physical hardware components. The distributed services also include a live-virtual-machine migration service that temporarily halts execution of a virtual machine, encapsulates the virtual machine in an OVF package, transmits the OVF package to a different physical server, and restarts the virtual machine on the different physical server from a virtual-machine state recorded when execution of the virtual machine was halted. The distributed services also include a distributed backup service that provides centralized virtual-machine backup and restore.

The core services provided by the VI management server include host configuration, virtual-machine configuration, virtual-machine provisioning, generation of virtual-data-center alarms and events, ongoing event logging and statistics collection, a task scheduler, and a resource-management module. Each physical server 820-822 also includes a host-agent virtual machine 828-830 through which the virtualization layer can be accessed via a virtual-infrastructure application programming interface ("API"). This interface allows a remote administrator or user to manage an individual server through the infrastructure API. The virtual-data-center agents 824-826 access virtualization-layer server information through the host agents. The virtual-data-center agents are primarily responsible for offloading certain of the virtual-data-center management-server functions specific to a particular physical server to that physical server. The virtual-data-center agents relay and enforce resource allocations made by the VI management server, relay virtual-machine provisioning and configuration-change commands to host agents, monitor and collect performance statistics, alarms, and events communicated to the virtual-data-center agents by the local host agents through the interface API, and to carry out other, similar virtual-data-management tasks.

The virtual-data-center abstraction provides a convenient and efficient level of abstraction for exposing the computational resources of a cloud-computing facility to cloud-computing-infrastructure users. A cloud-director management server exposes virtual resources of a cloud-computing facility to cloud-computing-infrastructure users. In addition, the cloud director introduces a multi-tenancy layer of abstraction, which partitions virtual data centers ("VDCs") into tenant-associated VDCs that can each be allocated to a particular individual tenant or tenant organization, both referred to as a "tenant." A given tenant can be provided one or more tenant-associated VDCs by a cloud director managing the multi-tenancy layer of abstraction within a cloud-computing facility. The cloud services interface (308 in FIG. 3) exposes a virtual-data-center management interface that abstracts the physical data center.

Figure 9:
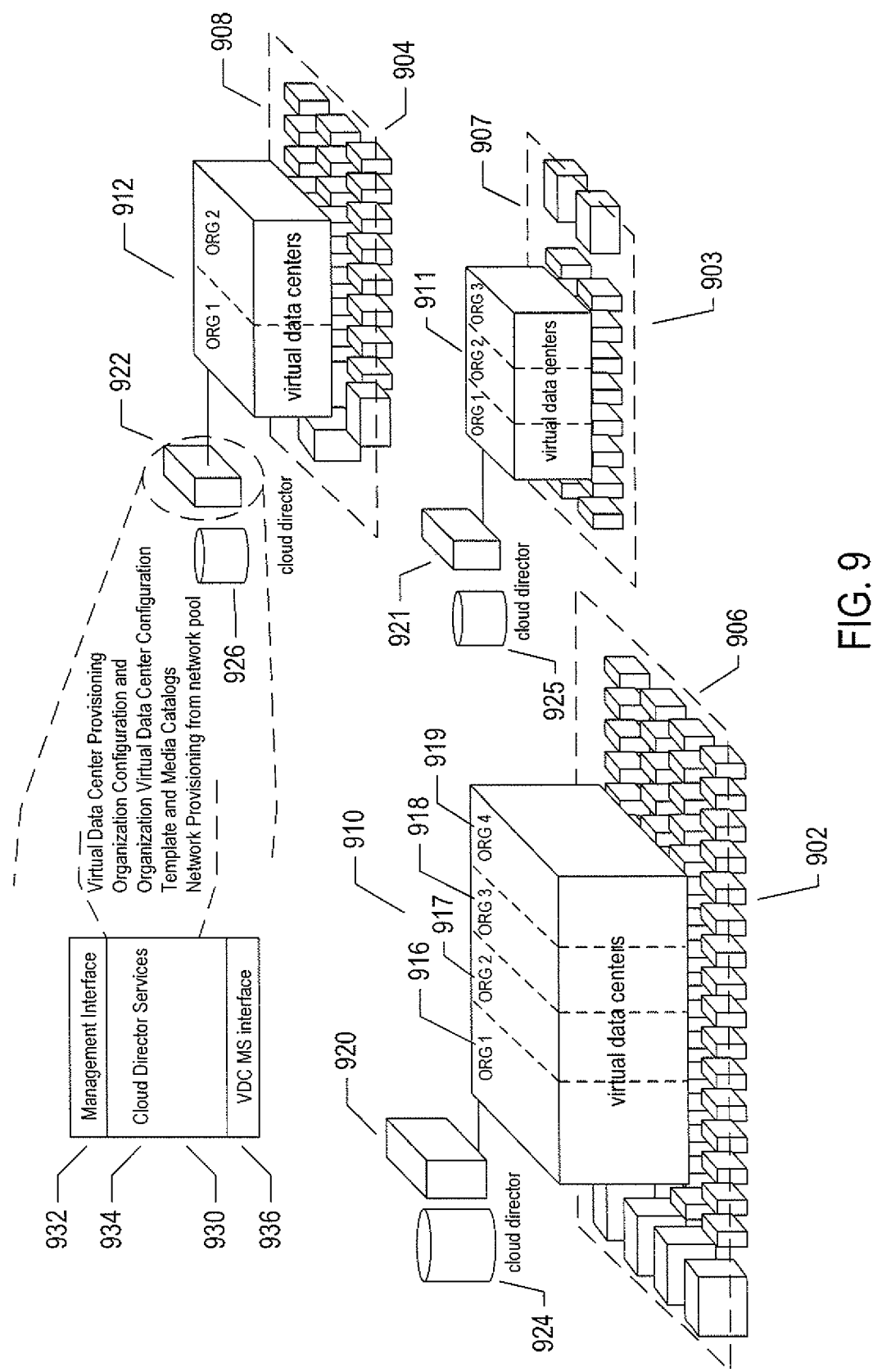
FIG. 9 illustrates a cloud-director level of abstraction.

FIG. 9 illustrates a cloud-director level of abstraction. In FIG. 9, three different physical data centers 902-904 are shown below planes representing the cloud-director layer of abstraction 906-908. Above the planes representing the cloud-director level of abstraction, multi-tenant virtual data centers 910-912 are shown. The resources of these multi-tenant virtual data centers are securely partitioned in order to provide secure virtual data centers to multiple tenants, or cloud-services-accessing organizations. For example, a cloud-services-provider virtual data center 910 is partitioned into four different tenant-associated virtual-data centers within a multi-tenant virtual data center for four different tenants 916-919. Each multi-tenant virtual data center is managed by a cloud director comprising one or more cloud-director servers 920-922 and associated cloud-director databases 924-926. Each cloud-director server or servers runs a cloud-director virtual appliance 930 that includes a cloud-director management interface 932, a set of cloud-director services 934, and a virtual-data-center management-server interface 936. The cloud-director services include an interface and tools for provisioning multi-tenant virtual data center virtual data centers on behalf of tenants, tools and interfaces for configuring and managing tenant organizations, tools and services for organization of virtual data centers and tenant-associated virtual data centers within the multi-tenant virtual data center, services associated with template and media catalogs, and provisioning of virtualization networks from a network pool. Templates are virtual machines that each contains an OS and/or one or more virtual machines containing applications. A template may include much of the detailed contents of virtual machines and virtual appliances that are encoded within OVF packages, so that the task of configuring a virtual machine or virtual appliance is significantly simplified, requiring only deployment of one OVF package. These templates are stored in catalogs within a tenant's virtual-data center. These catalogs are used for developing and staging new virtual appliances and published catalogs are used for sharing templates in virtual appliances across organizations. Catalogs may include OS images and other information relevant to construction, distribution, and provisioning of virtual appliances.

Considering FIGS. 7 and 9, the VI management server and cloud-director layers of abstraction can be seen, as discussed above, to facilitate employment of the virtualdata-center concept within private and public clouds. However, this level of abstraction does not fully facilitate aggregation of single-tenant and multi-tenant virtual data centers into heterogeneous or homogeneous aggregations of cloud-computing facilities.

Figure 10:
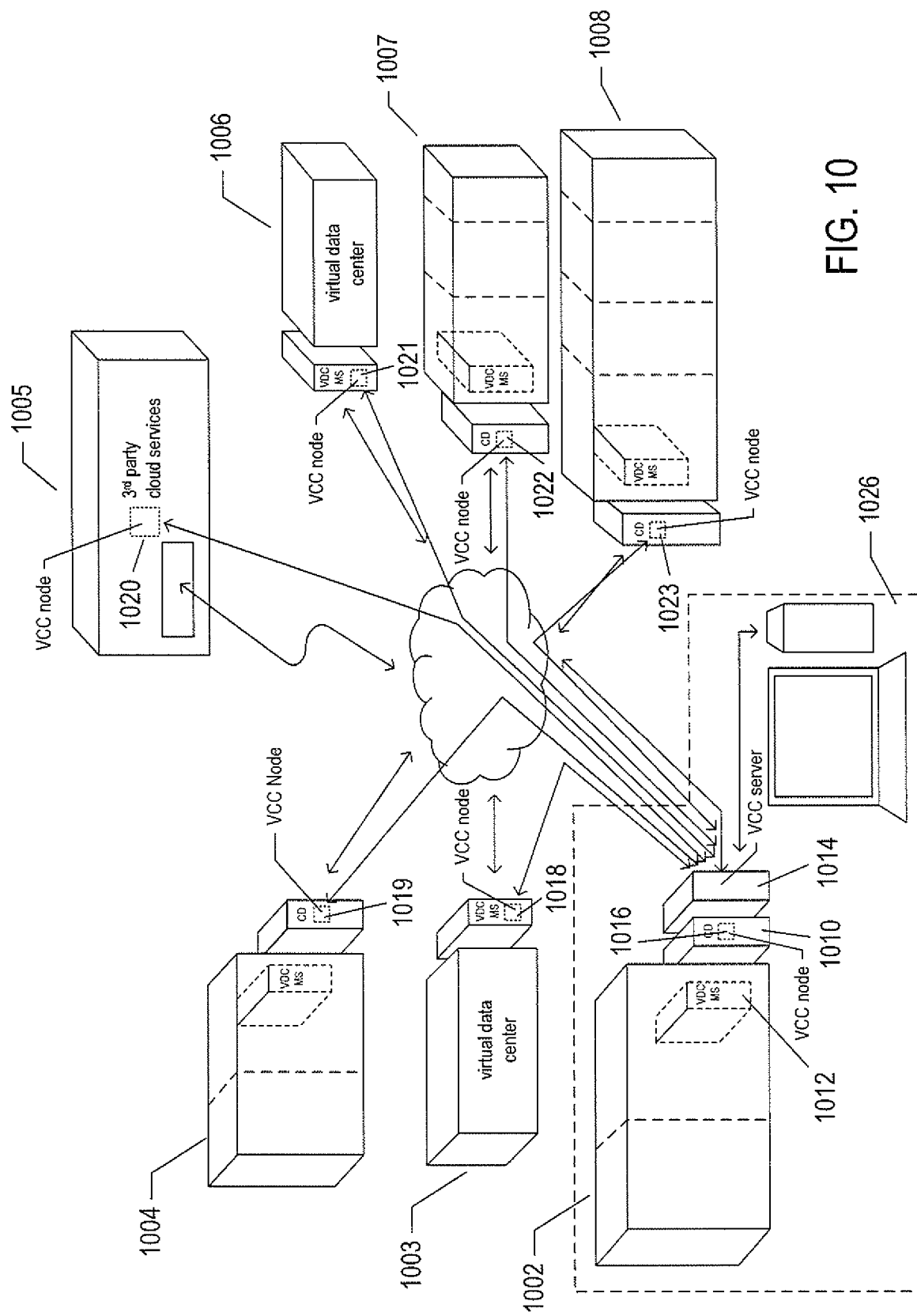
FIG. 10 illustrates virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds.

FIG. 10 illustrates virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds. VMware vCloud™ VCC servers and nodes are one example of VCC server and nodes. In FIG. 10, seven different cloud-computing facilities are illustrated 1002-1008. Cloud-computing facility 1002 is a private multi-tenant cloud with a cloud director 1010 that interfaces to a VI management server 1012 to provide a multi-tenant private cloud comprising multiple tenant-associated virtual data centers. The remaining cloud-computing facilities 1003-1008 may be either public or private cloud-computing facilities and may be single-tenant virtual data centers, such as virtual data centers 1003 and 1006, multi-tenant virtual data centers, such as multi-tenant virtual data centers 1004 and 1007-1008, or any of various different kinds of third-party cloud-services facilities, such as third-party cloud-services facility 1005. An additional component, the VCC server 1014, acting as a controller is included in the private cloud-computing facility 1002 and interfaces to a VCC node 1016 that runs as a virtual appliance within the cloud director 1010. A VCC server may also run as a virtual appliance within a VI management server that manages a single-tenant private cloud. The VCC server 1014 additionally interfaces, through the Internet, to VCC node virtual appliances executing within remote VI management servers, remote cloud directors, or within the third-party cloud services 1018-1023. The VCC server provides a VCC server interface that can be displayed on a local or remote terminal, PC, or other computer system 1026 to allow a cloud-aggregation administrator or other user to access VCC-server-provided aggregate-cloud distributed services. In general, the cloud-computing facilities that together form a multiple-cloud-computing aggregation through distributed services provided by the VCC server and VCC nodes are geographically and operationally distinct.

Workflow-Development-and-Process-Automation Application

Figure 11:
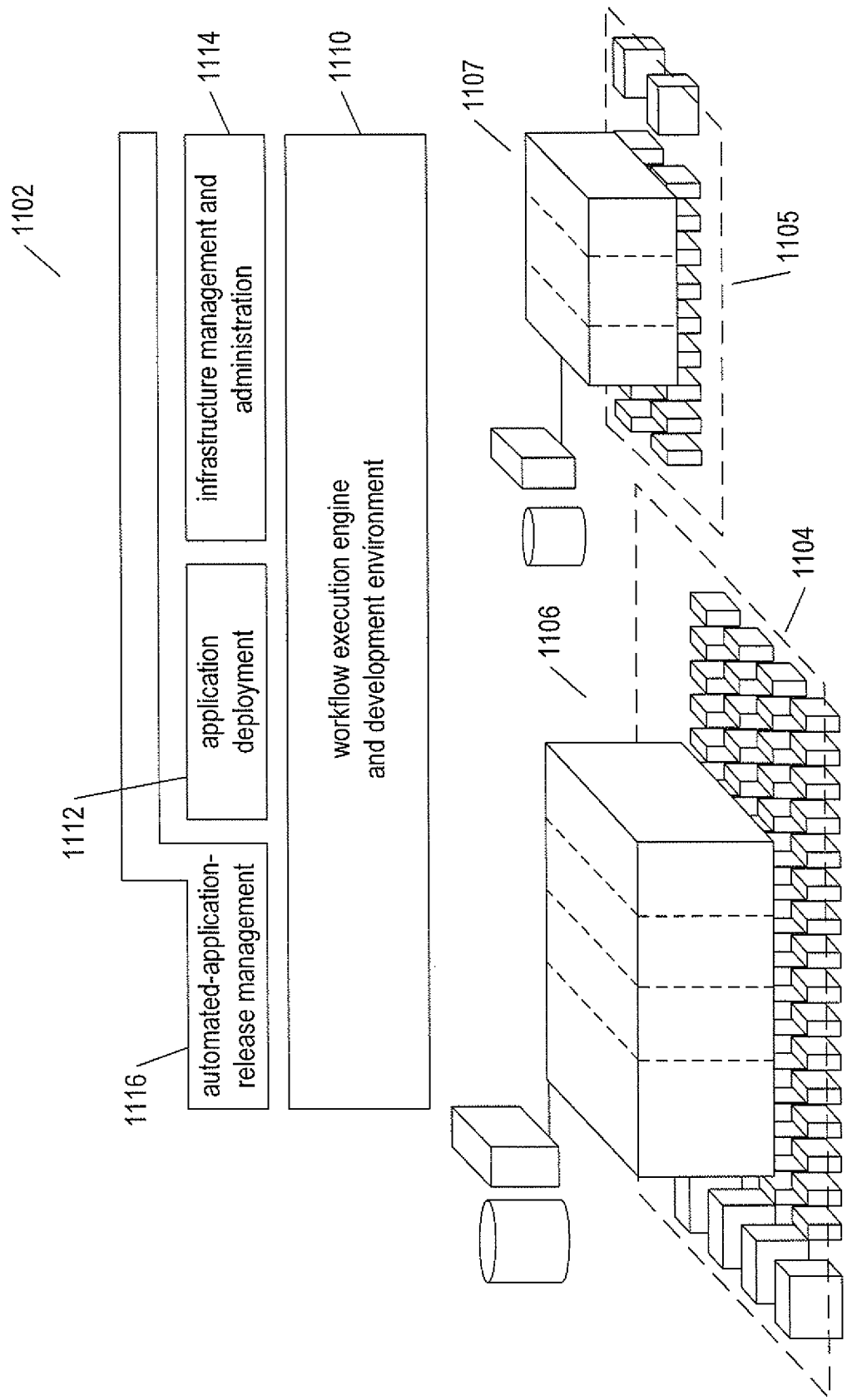
FIG. 11 illustrates a workflow-development-and-process-automation application workflow-based cloud-management facility that has been developed to provide for development and execution of process-automation workflows.

FIG. 11 illustrates a workflow-development-and-process-automation application workflow-based cloud-management facility that has been developed to provide for development and execution of process-automation workflows. The workflow-development-and-process-automation application ("WDPAA") provides a development environment for workflows that can access management facilities of virtual data centers and virtual-data-center aggregations. The WDPAA forms a foundation for workflow-based management, administration, application deployment, and automated application-release management facilities, used to manage and administer cloud-computing aggregations, such as those discussed above with reference to FIG. 10, cloud-computing aggregations, such as those discussed above with reference to FIG. 9, and a variety of additional types of cloud-computing facilities as well as to deploy applications and continuously and automatically release complex applications on various types of cloud-computing aggregations. As shown in FIG. 11, the workflow-based management, administration, application deployment, and automated application-release management facilities 1102 are implemented above the physical hardware layers 1104 and 1105 and virtual data centers 1106 and 1107 of a cloud-computing facility or cloud-computing-facility aggregation. The workflow-based management, administration, application deployment, and automated application-release management facilities includes a WDPAA 1110, an application-deployment facility 1112, an infrastructure-management-and-administration facility 1114, and an automated-application-release-management facility 1116. The WDPAA 1110 provides an integrated development environment for constructing, validating; testing, and executing graphically expressed workflows, discussed in detail below. Workflows are high-level programs with many built-in functions, scripting tools, and development tools and graphical interfaces. Workflows provide an underlying foundation for the infrastructure-management-and-administration facility 1114, the application-development facility 1112, and the automated-application-release-management facility 1116. The infrastructure-management-and-administration facility 1114 provides a powerful and intuitive suite of management and administration tools that allow the resources of a cloud-computing facility or cloud-computing-facility aggregation to be distributed among clients and users of the cloud-computing facility or facilities and to be administered by a hierarchy of general and specific administrators. The infrastructure-management-and-administration facility 1114 provides interfaces that allow service architects to develop various types of services and resource descriptions that can be provided to users and clients of the cloud-computing facility or facilities, including many management and administrative services and functionalities implemented as workflows. The application-deployment facility 1112 provides an integrated application-deployment environment to facilitate building and launching complex cloud-resident applications on the cloud-computing facility or facilities. The application-deployment facility provides access to one or more artifact repositories that store and logically organize binary files and other artifacts used to build complex cloud-resident applications as well as access to automated tools used, along with workflows, to develop specific automated application-deployment tools for specific cloud-resident applications. The automated-application-release-management facility 1116 provides workflow-based automated release-management tools that enable cloud-resident-application developers to continuously generate application releases produced by automated deployment, testing, and validation functionalities.

Figure 12:
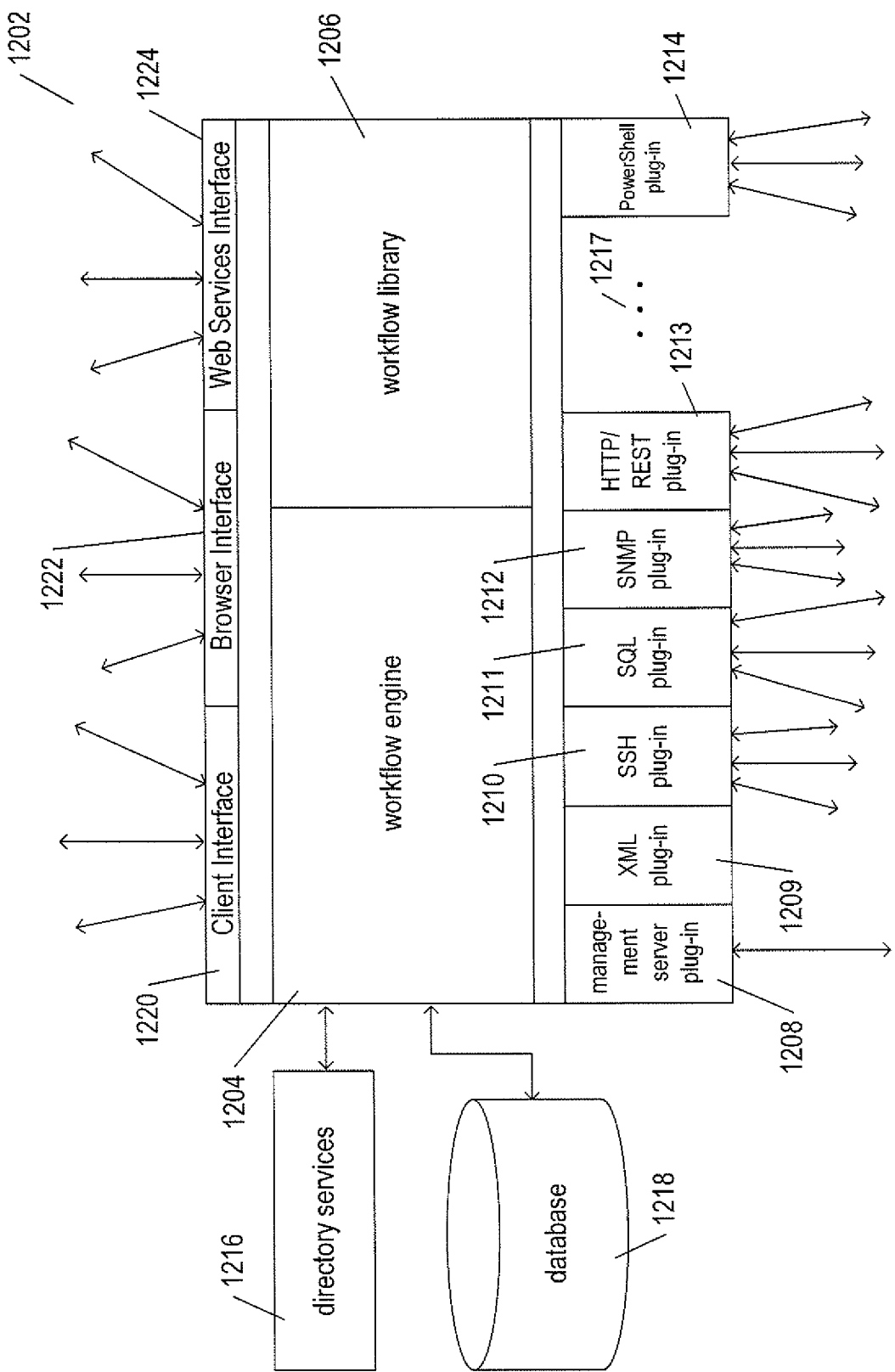
FIG. 12 provides an architectural diagram of the workflow-execution engine and development environment.

Next, the WDPAA is discussed in greater detail. FIG. 12 provides an architectural diagram of the WDPAA. The WDPAA 1202 includes a workflow engine 1204, which executes workflows to carry out the many different administration, management, and development tasks encoded in workflows that comprise the functionalities of the WDPAA. The workflow engine, during execution of workflows, accesses many built-in tools and functionalities provided by a workflow library 1206. In addition, both the routines and functionalities provided by the workflow library and the workflow engine access a wide variety of tools and computational facilities, provided by a wide variety of third-party providers, through a large set of plug-ins 1208-1214. Note that the ellipses 1216 indicate that many additional plug-ins provide, to the workflow engine and workflow-library routines, access to many additional third-party computational resources. Plug-in 1208 provides for access, by the workflow engine and workflow-library routines, to a cloud-computing-facility or cloud-computing-facility-aggregation management server, such as a cloud director (920 in FIG. 9) or VCC server (1014 in FIG. 10). The XML plug-in 1209 provides access to a complete document object model ("DOM") extensible markup language ("XML") parser. The SSH plug-in 1210 provides access to an implementation of the Secure Shell v2 ("SSH-2") protocol. The structured query language ("SQL") plug-in 1211 provides access to a Java database connectivity ("JDBC") API that, in turn, provides access to a wide range of different types of databases. The simple network management protocol ("SNMP") plug-in 1212 provides access to an implementation of the SNMP protocol that allows the WDPAA to connect to, and receive information from, various SNMP-enabled systems and devices. The hypertext transfer protocol ("HTTP")/representational state transfer ('REST") plug-in 1213 provides access to REST web services and hosts. The Power-Shell plug-in 1214 allows the WDPAA to manage PowerShell hosts and run custom PowerShell operations. The workflow engine 1204 additionally accesses directory services 1216, such as a lightweight directory access protocol ("LDAP") directory, that maintain distributed directory information and manages password-based user login. The workflow engine also accesses a dedicated database 1218 in which workflows and other information are stored. The WDPAA can be accessed by clients running a client application that interfaces to a client interface 1220, by clients using web browsers that interface to a browser interface 1222, and by various applications and other executables running on remote computers that access the WDPAA using a REST or small-object-access protocol ("SOAP") via a web-services interface 1224. The client application that runs on a remote computer and interfaces to the client interface 1220 provides a powerful graphical user interface that allows a client to develop and store workflows for subsequent execution by the workflow engine. The user interface also allows clients to initiate workflow execution and provides a variety of tools for validating and debugging workflows. Workflow execution can be initiated via the browser interface 1222 and web-services interface 1224. The various interfaces also provide for exchange of data output by workflows and input of parameters and data to workflows.

Figure 13A:
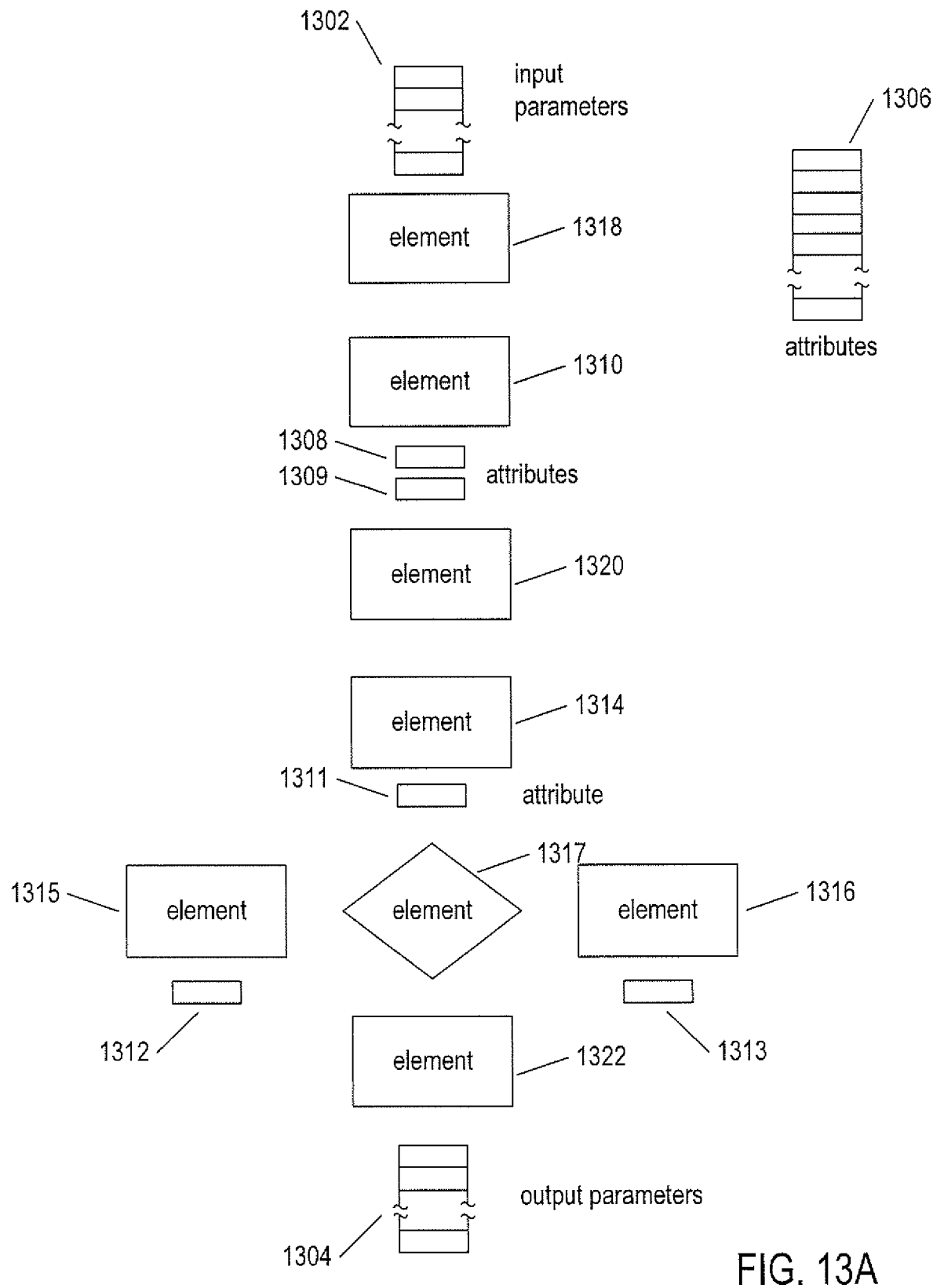
FIGS. 13A-C illustrate the structure of a workflow.
Figure 13B:
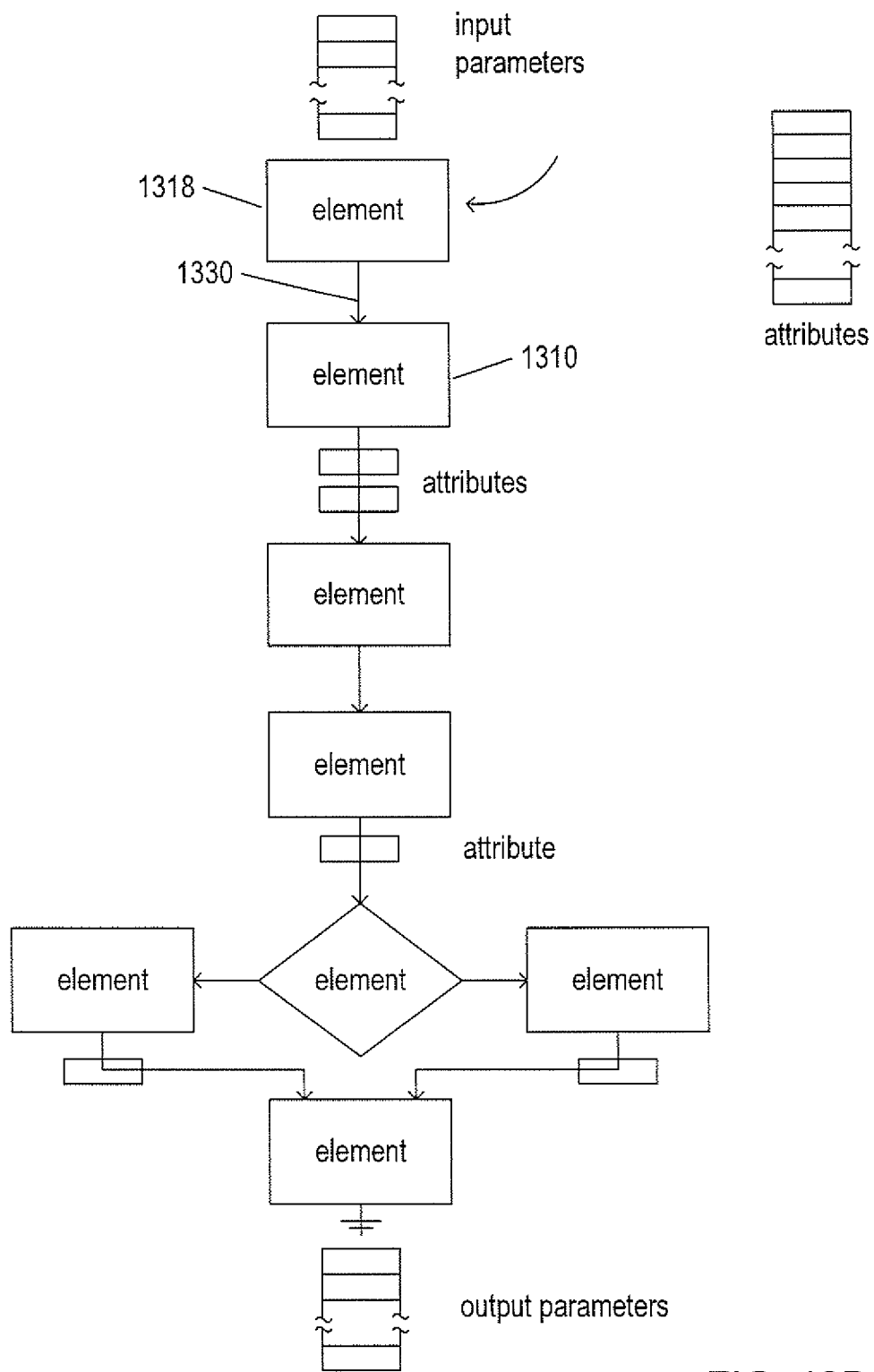
Figure 13C:
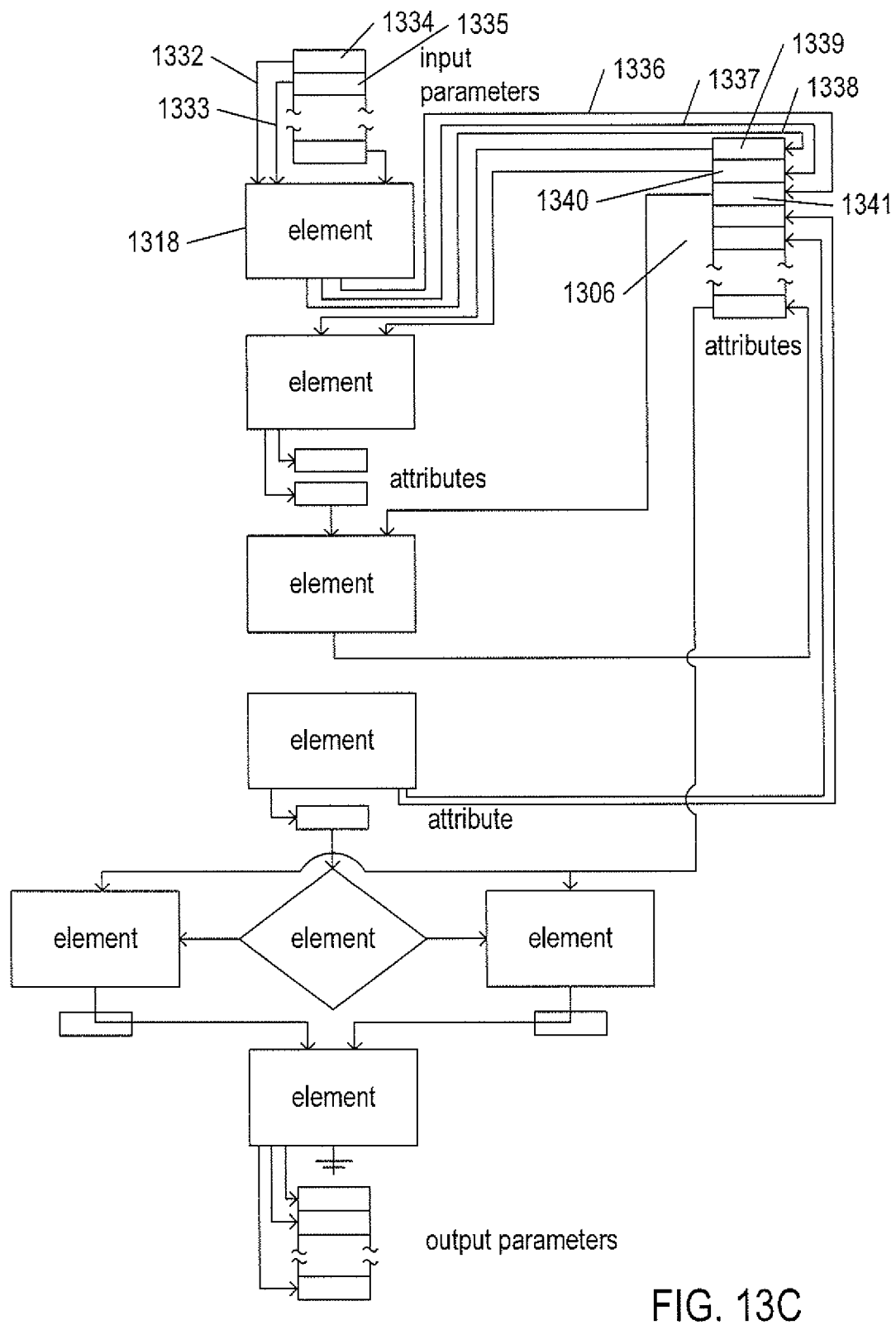

FIGS. 13A-C illustrate the structure of a workflow. A workflow is a graphically represented high-level program. FIG. 13A shows the main logical components of a workflow. These components include a set of one or more input parameters 1302 and a set of one or more output parameters 1304. In certain cases, a workflow may not include input and/or output parameters, but, in general, both input parameters and output parameters are defined for each workflow. The input and output parameters can have various different data types, with the values for a parameter depending on the data type associated with the parameter. For example, a parameter may have a string data type, in which case the values for the parameter can include any alphanumeric string or Unicode string of up to a maximum length. A workflow also generally includes a set of parameters 1306 that store values manipulated during execution of the workflow. This set of parameters is similar to a set of global variables provided by many common programming languages. In addition, attributes can be defined within individual elements of a workflow, and can be used to pass values between elements. In FIG. 13A, for example, attributes 1308-1309 are defined within element 1310 and attributes 1311, 1312, and 1313 are defined within elements 1314, 1315, and 1316, respectively. Elements, such as elements 1318, 1310, 1320, 1314-1316, and 1322 in FIG. 13A, are the execution entities within a workflow. Elements are equivalent to one or a combination of common constructs in programming languages, including subroutines, control structures, error handlers, and facilities for launching asynchronous and synchronous procedures. Elements may correspond to script routines, for example, developed to carry out an almost limitless number of different computational tasks. Elements are discussed, in greater detail, below.

As shown in FIG. 13B, the logical control flow within a workflow is specified by links, such as link 1330 which indicates that element 1310 is executed following completion of execution of element 1318. In FIG. 13B, links between elements are represented as single-headed arrows. Thus, links provide the logical ordering that is provided, in a common programming language, by the sequential ordering of statements. Finally, as shown in FIG. 13C, bindings that bind input parameters, output parameters, and attributes to particular roles with respect to elements specify the logical data flow in a workflow. In FIG. 13C, single-headed arrows, such as single-headed arrow 1332, represent bindings between elements and parameters and attributes. For example, bindings 1332 and 1333 indicate that the values of the first input parameters 1334 and 1335 are input to element 1318. Thus, the first two input parameters 1334-1335 play similar roles as arguments to functions in a programming language. As another example, the bindings represented by arrows 1336-1338 indicate that element 1318 outputs values that are stored in the first three attributes 1339, 1340, and 1341 of the set of attributes 1306.

Thus, a workflow is a graphically specified program, with elements representing executable entities, links representing logical control flow, and bindings representing logical data flow. A workflow can be used to specific arbitrary and arbitrarily complex logic, in a similar fashion as the specification of logic by a compiled, structured programming language, an interpreted language, or a script language.

FIGS. 14A-B include a table of different types of elements that may be included in a workflow. Workflow elements may include a start-workflow element 1402 and an end-workflow element 1404, examples of which include elements 1318 and 1322, respectively, in FIG. 13A. Decision workflow elements 1406-1407, an example of which is element 1317 in FIG. 13A, function as an if-then-else construct commonly provided by structured programming languages. Scriptable-task elements 1408 are essentially script routines included in a workflow. A user-interaction element 1410 solicits input from a user during workflow execution. Waiting-timer and waiting-event elements 1412-1413 suspend workflow execution for a specified period of time or until the occurrence of a specified event. Thrown-exception elements 1414 and error-handling elements 1415-1416 provide functionality commonly provided by throw-catch constructs in common programming languages. A switch element 1418 dispatches control to one of multiple paths, similar to switch statements in common programming languages, such as C and C++. A foreach element 1420 is a type of iterator. External workflows can be invoked from a currently executing workflow by a workflow element 1422 or asynchronous-workflow element 1423. An action element 1424 corresponds to a call to a workflow-library routine. A workflow-note element 1426 represents a comment that can be included within a workflow. External workflows can also be invoked by schedule-workflow and nested-workflows elements 1428 and 1429.

Figure 15A:
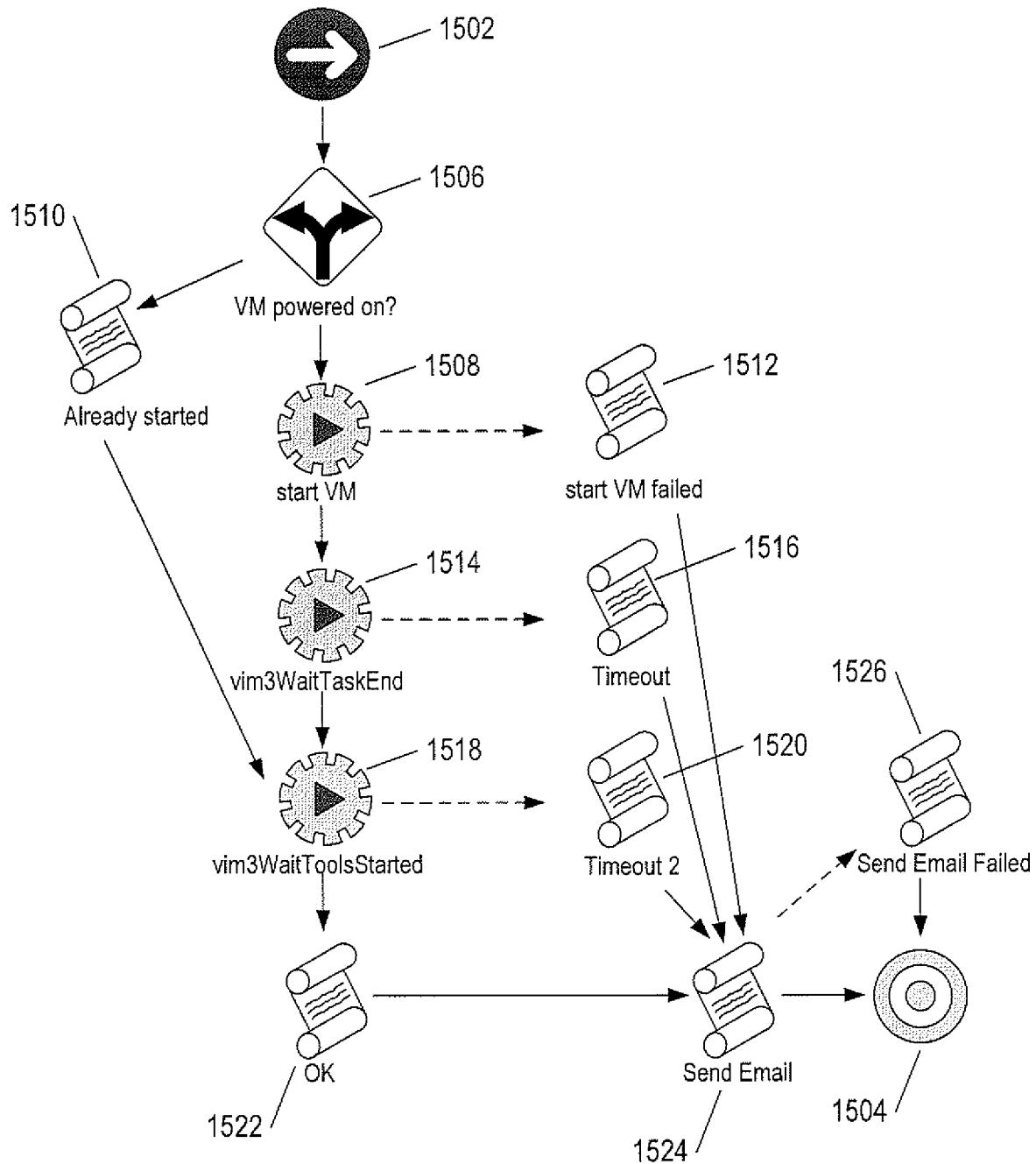
FIGS. 15A-B show an example workflow.
Figure 15B:
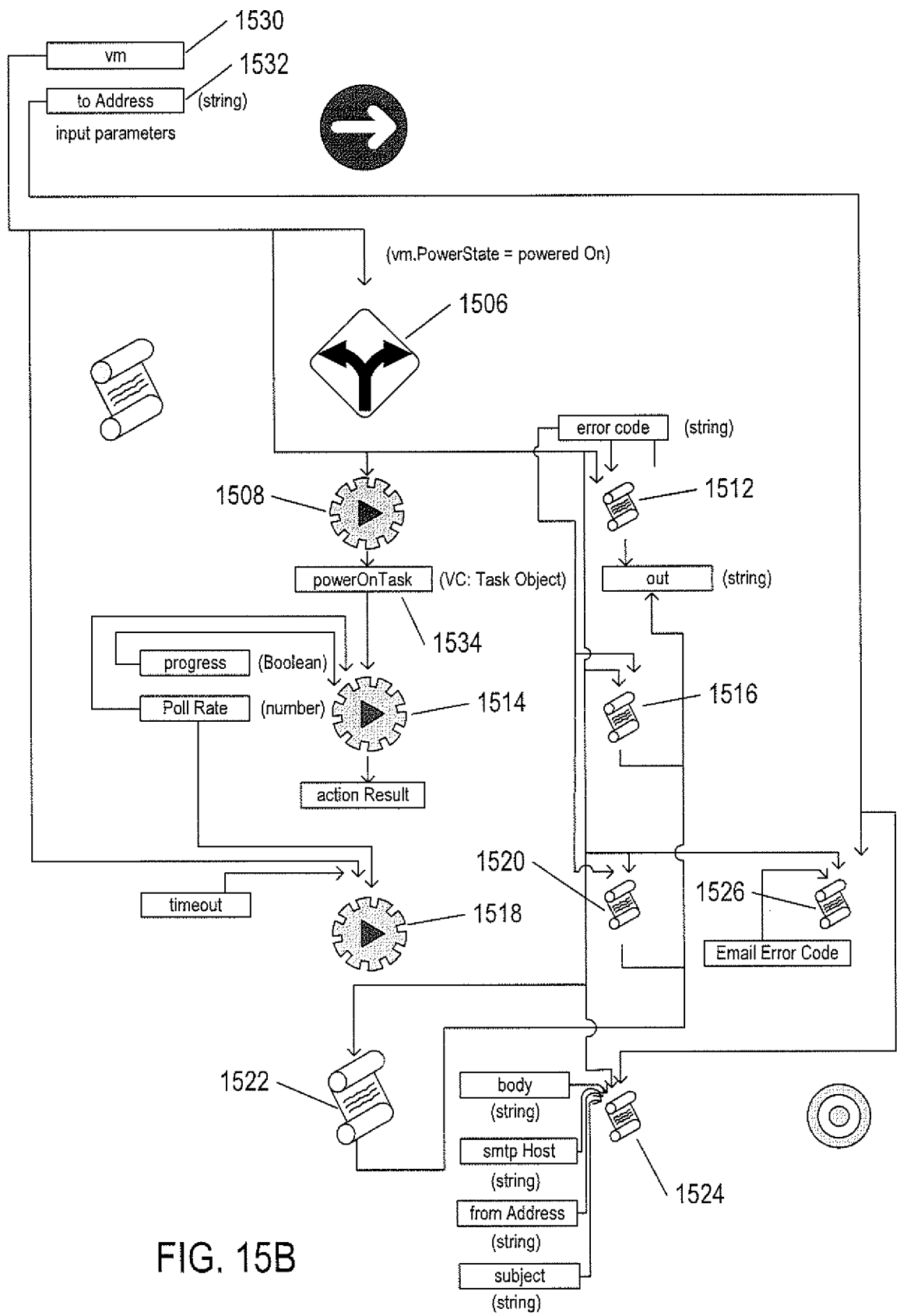

FIGS. 15A-B show an example workflow. The workflow shown in FIG. 15A is a virtual-machine-starting workflow that prompts a user to select a virtual machine to start and provides an email address to receive a notification of the outcome of workflow execution. The prompts are defined as input parameters. The workflow includes a start-workflow element 1502 and an end-workflow element 1504. The decision element 1506 checks to see whether or not the specified virtual machine is already powered on. When the VM is not already powered on, control flows to a start-VM action 1508 that calls a workflow-library function to launch the VM. Otherwise, the fact that the VM was already powered on is logged, in an already-started scripted element 1510. When the start operation fails, a start-VM-failed scripted element 1512 is executed as an exception handler and initializes an email message to report the failure. Otherwise, control flows to a vim3WaitTaskEnd action element 1514 that monitors the VM-starting task. A timeout exception handler is invoked when the start-VM task does not finish within a specified time period. Otherwise, control flows to a vim3WaitToolsStarted task 1518 which monitors starting of a tools application on the virtual machine. When the tools application fails to start, then a second timeout exception handler is invoked 1520. When all the tasks successfully complete, an OK scriptable task 1522 initializes an email body to report success. The email that includes either an error message or a success message is sent in the send-email scriptable task 1524. When sending the email fails, an email exception handler 1526 is called. The already-started, OK, and exception-handler scriptable elements 1510, 1512, 1516, 1520, 1522, and 1526 all log entries to a log file to indicate various conditions and errors. Thus, the workflow shown in FIG. 15A is a simple workflow that allows a user to specify a VM for launching to run an application.

FIG. 15B shows the parameter and attribute bindings for the workflow shown in FIG. 15A. The VM to start and the address to send the email are shown as input parameters 1530 and 1532. The VM to start is input to decision element 1506, start-VM action element 1508, the exception handlers 1512, 1516, 1520, and 1526, the send-email element 1524, the OK element 1522, and the vim3WaitToolsStarted element 1518. The email address furnished as input parameter 1532 is input to the email exception handler 1526 and the send-email element 1524. The VM-start task 1508 outputs an indication of the power on task initiated by the element in attribute 1534 which is input to the vim3WaitTaskEnd action element 1514. Other attribute bindings, input, and outputs are shown in FIG. 15B by additional arrows.

Figure 16A:
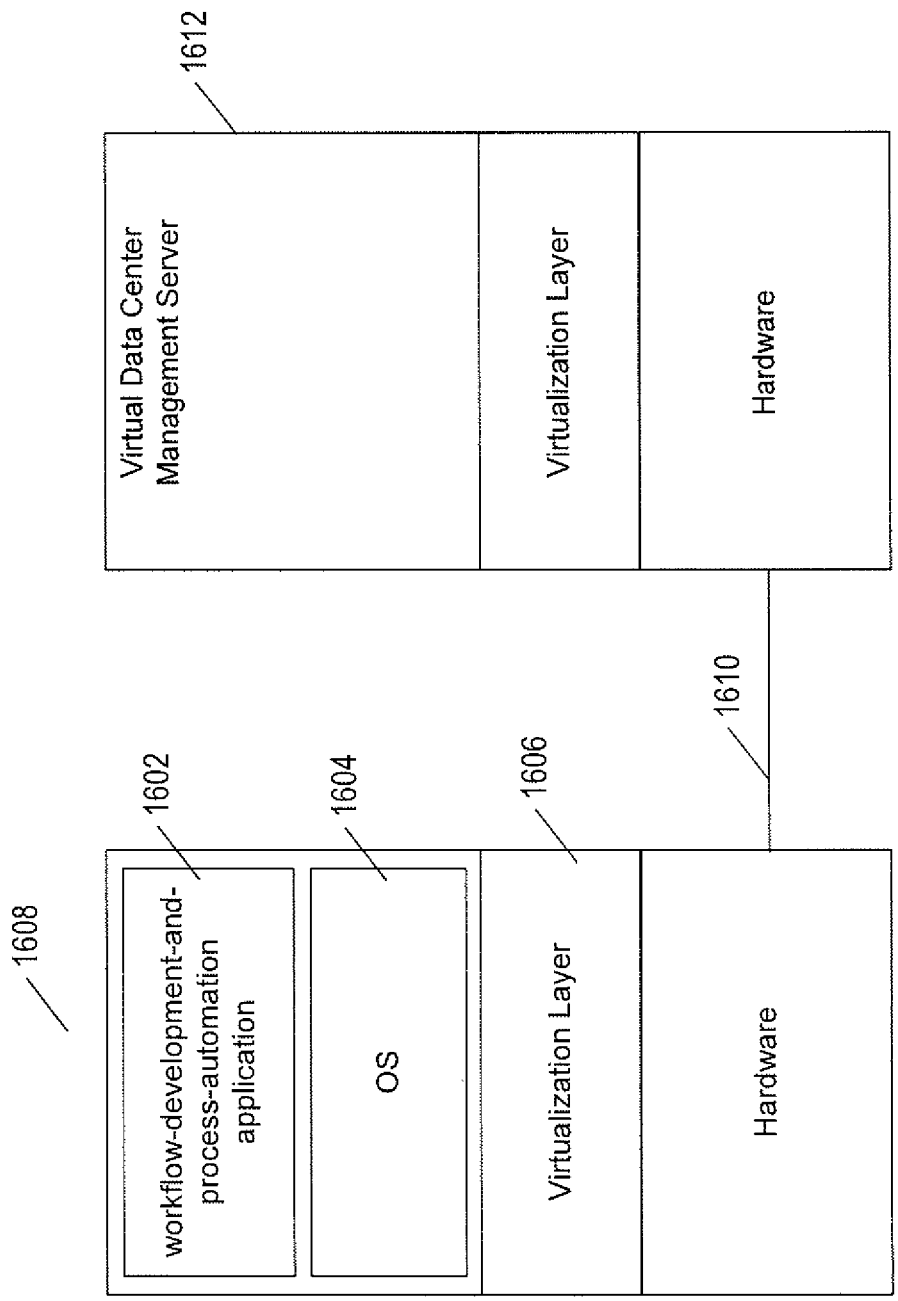
FIG. 16A illustrates a single-server-resident non-distributed version of the WDPAA.

Currently Disclosed Methods and Subsystems that Synchronize Application-Instance Configurations Within a Distributed Workflow-Development-and-Process-Automation Application FIG. 16A illustrates a single-server-resident non-distributed version of the WDPAA. The WDPAA 1602 runs within a virtual machine above a guest operating system 1604 in an execution environment provided by a virtualization layer 1606 within a server computer system 1608. The server 1608 is connected through a communications medium 1610 to a management server 1612, with the WDPAA able to access management-server functionality through the management-server plug-in and communication medium (1208 in FIG. 12). The non-distributed version of the WDPAA can be implemented without the complexity associated with distributed applications, but is constrained in computational bandwidth, throughput, and flexibility as a result of the computational-bandwidth constraints associated with a single server.

Figure 16B:
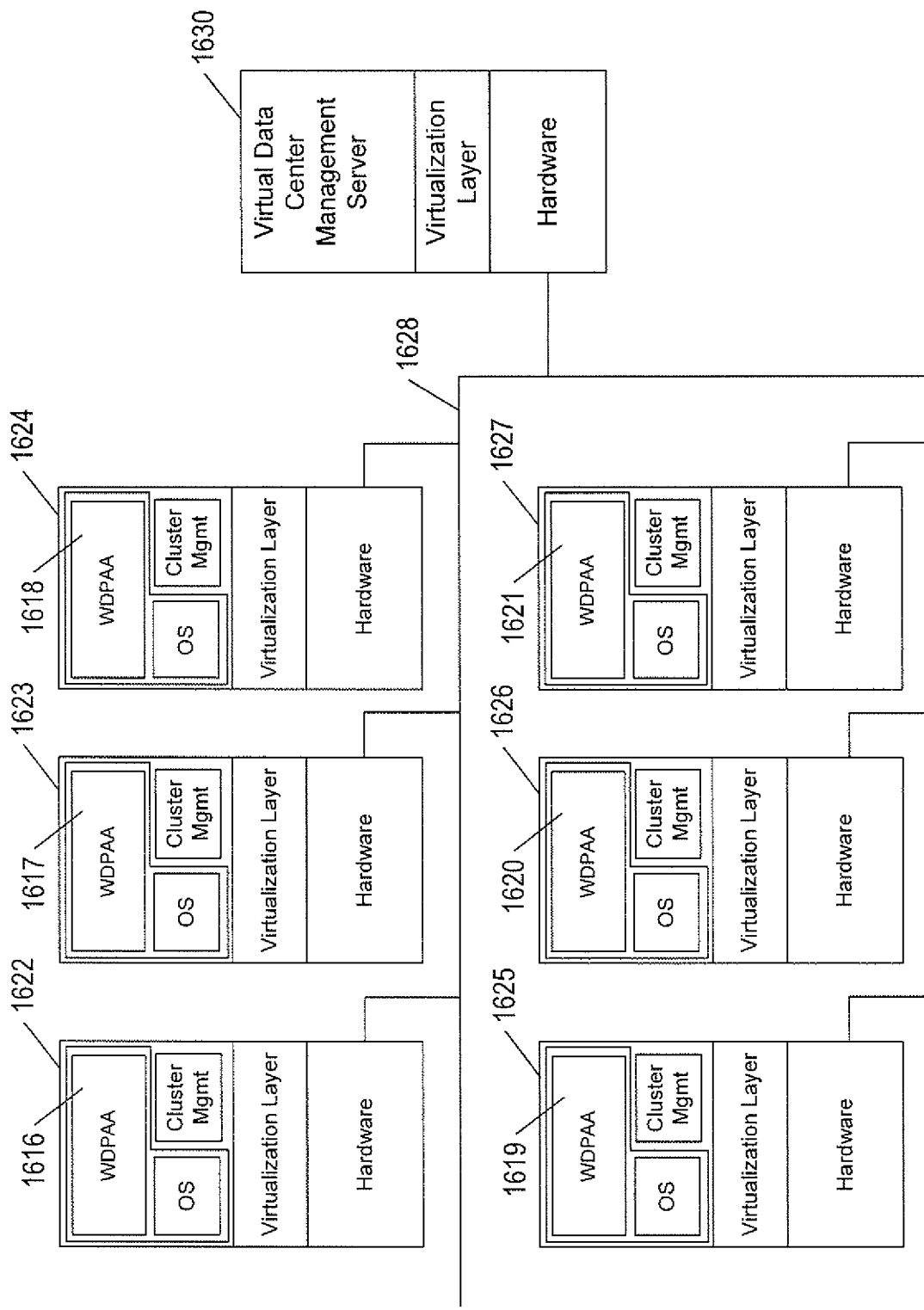
FIG. 16B illustrates a distributed version of the WDPAA.

In many applications, it is desirable to distribute the WDPAA across multiple servers in order to achieve greater computational bandwidth, throughput, and scheduling flexibility provided by load-balancing across multiple WDPAA instances. The benefits of distributing an application are not particular to the WDPAA, but are commonly obtained by distributing many different types of applications. Thus, the currently disclosed methods and subsystems are applicable to many types of distributed applications in addition to the WDPAA. FIG. 16B illustrates a distributed version of the WDPAA. In the example shown in FIG. 16B, six WDPAA instances 1616-1621 execute within six different server computer systems 1622-1627, all connected by a communications medium 1628 to a management server 1630.

Because the WDPAA was originally developed as a non-distributed application, a straightforward approach to distributing the WDPAA is for each WDPAA instance to run relatively independently within each server node. However, to provide for flexible scheduling of workflow execution across the multiple servers and WDPAA instances, each WDPAA instance needs to be configured identically to all other WDPAA instances that together compose the distributed WDPAA. For example, the WDPAA instances need to have incorporated identical sets of plug-ins and to have identical operational parameter values. Otherwise, a workflow that is executable within the execution environment provided by a first WDPAA instance may not be executable within the execution environment provided by a second WDPAA. While it might be naively supposed that each WDPAA instance could be separately, manually configured to a common application configuration shared by all of the WDPAA instances, manual configuration would be extremely error-prone, tedious, costly in administrative-personnel time, and inefficient from the standpoint of workflow-execution throughput, since manual configuration would, at best, be associated with significant distributed-WDPAA downtime.

Figure 17:
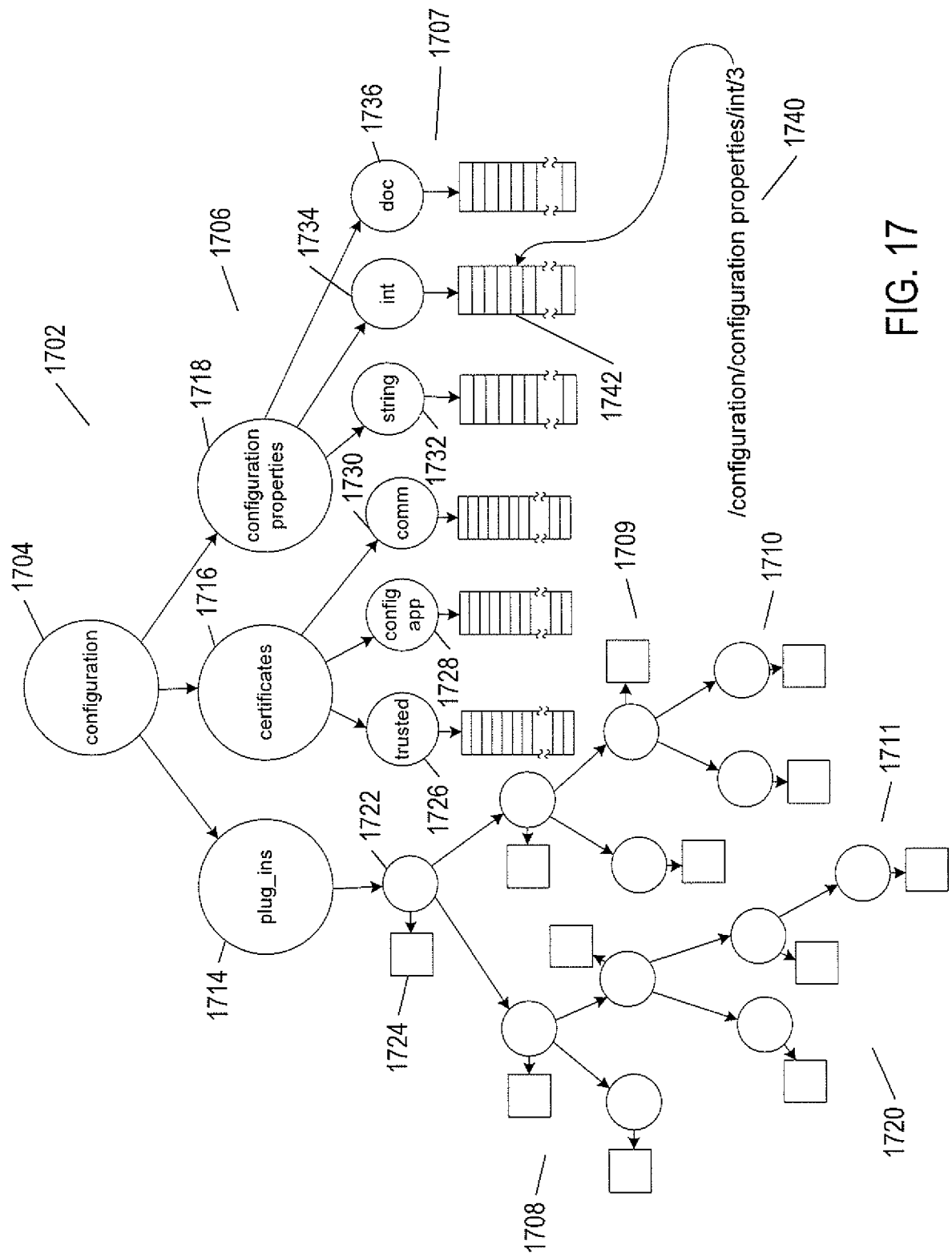
FIG. 17 illustrates an example WDPAA configuration.

FIG. 17 illustrates an example WDPAA configuration. The WDPAA configuration is represented as a tree-like data structure 1702 with a root node 1704 and various lower levels of nodes 1706-1711. The first lower level of nodes 1706 represent categories of configuration information, including, in the example configuration 1702, plug-ins 1714, certificates 1716, and configuration properties or parameters 1718. The plug-ins are included in a binary tree 1720 in which each disk-shaped node, such as node 1722, represents a plug-in name and the square child node 1724 associated with the plug-in name includes various plug-in parameters and descriptors, one of which is a universal resource identifier ("URI") indicating the location of the plug-in executable. The certificates 1716 include trusted certificates 1726, configured-application certificates 1728, and communications-subsystems certificates 1730. The various configuration properties or parameters include string-data-type parameters 1732, integer-data-type parameter 1734, and document or file parameters 1736. Each configuration element, such as a plug-in, a certificate, or a parameter, is associated with a name, such as the name 1744 the fourth integer configuration parameter 1742. The names are constructed as path-like names based on a traversal of the tree-like representation 1702 of the configuration information from the root node to the named configuration element.

Of course, many other types of configuration-element naming conventions can be employed in alternative implementations.

Figure 18B:
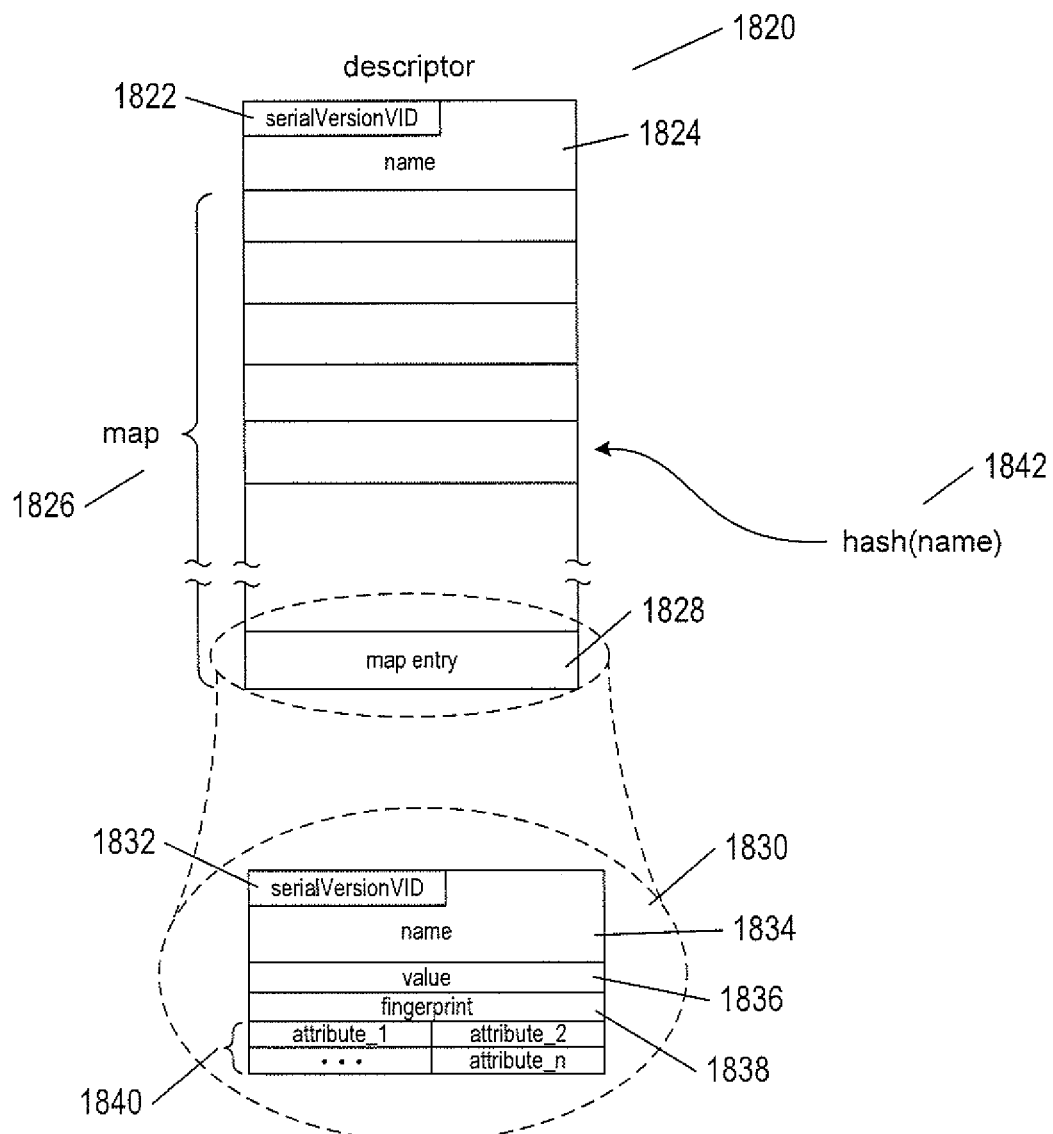
Figure 18C:
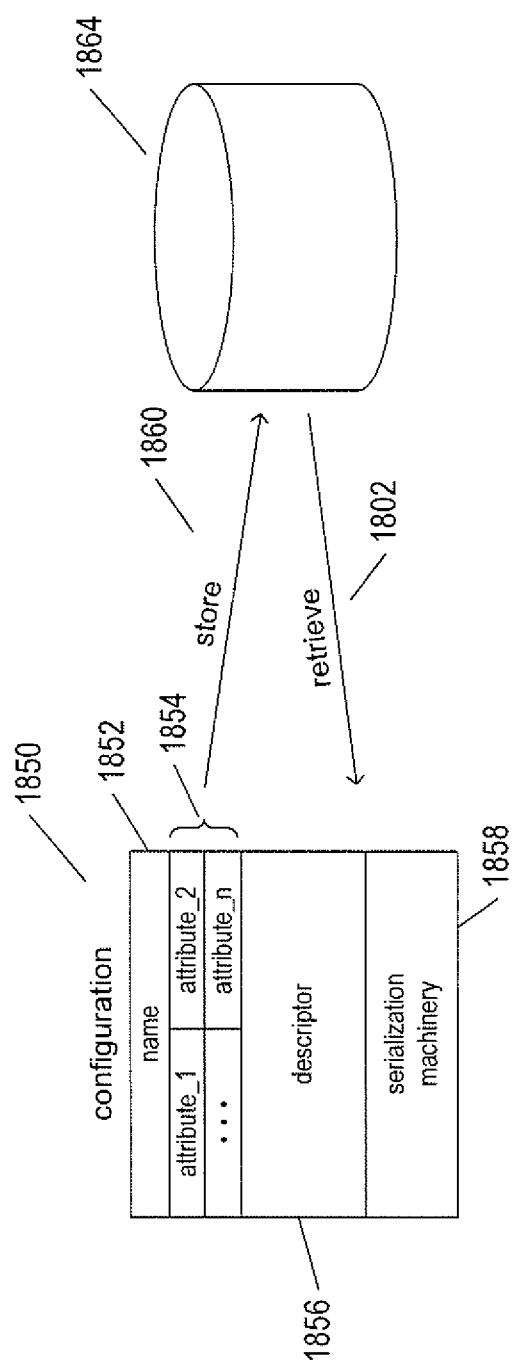

FIGS. 18A-C illustrate additions to the single-server-resident non-distributed WDPAA to facilitate aggregation of WDPAA instances into a distributed WDPAA. As shown in FIG. 18A, using the illustration conventions previously used in FIG. 16 B, each WDPAA instance includes an enhanced control-center subsystem 1802-1807 and a distributed-WDPAA configuration model 1808. The distributed-WDPAA configuration model 1808 includes a server-configuration object for each WDPAA instance 1810-1815 and is generally resident in memory as well as persisted in a database or in formatted files. The control-center subsystem and WDPAA configuration model may be fully or partially distributed, as shown in FIG. 18A, or they may be both alternatively implemented as centralized subsystems or appliances that communicate with the WDPAA instances. The control-center subsystem provides configuration facilities for updating the configurations of the WDPAA instances. In the distributed WDPAA, the control-center subsystem includes configuration-synchronization and configuration-monitoring functionalities, discussed below, that operate to ensure a common configuration among all of the WDPAA instances within a distributed WDPAA. Of course, in certain implementations, the common configuration may be shared by a subset of the WDPAA instances used to provide flexibility in workflow execution, load-balancing, and increased computational bandwidth.

FIG. 18B illustrates a descriptor object that contains configuration information for a WDPAA instance. The descriptor 1820 includes a version-identifier field 1822, a variable-length name 1824, and a map 1826 that includes multiple map entries, such as map entry 1828. Each map entry represents a particular configuration element. The details of map entry 1828 are shown in inset 1830. The map entry includes a version-identifier field 1832, a configuration-element name 1834, a configuration-element value 1836, a fingerprint 1838, and a number of additional attributes 1840. Various different attributes may be included in different implementations. One type of attribute may indicate whether or not a change in the configuration element should be accompanied by restarting the application or server, for example. Another type of attribute may indicate the date and time of the most recent change to the configuration-element value. Entries are found in the map by applying a hash function to the configuration-element name 1842 which returns an integer index of a corresponding map entry within the map. Configuration-element values may have various different types and forms. Configuration-parameter values may be strings, integers, floating-point values, file URIs, files and documents, and sets of values that include these and other data types. Plug-in values may each comprise a set of URIs as well as additional string and numeric attributes. The fingerprint is generated by a cryptographic hash of the value, in certain implementations. Cryptographic hashes have the property that small or modest changes to a value generally produce significant changes in the cryptographic-hash value, providing a concise and efficient method for identifying configuration-element-value changes.

FIG. 18C illustrates a server-configuration object. The server-configuration object 1850 includes a name field 1852, a number of attribute fields 1854, a descriptor object 1856, such as the descriptor object shown in FIG. 18B, and serialization machinery 1858 that allows the server-configuration object to be stored in 1860, and retrieved from 1862, mass storage 1864. As discussed above, the distributed-WDPAA configuration model includes a server-configuration object for each WDPAA instance.

Figure 19A:
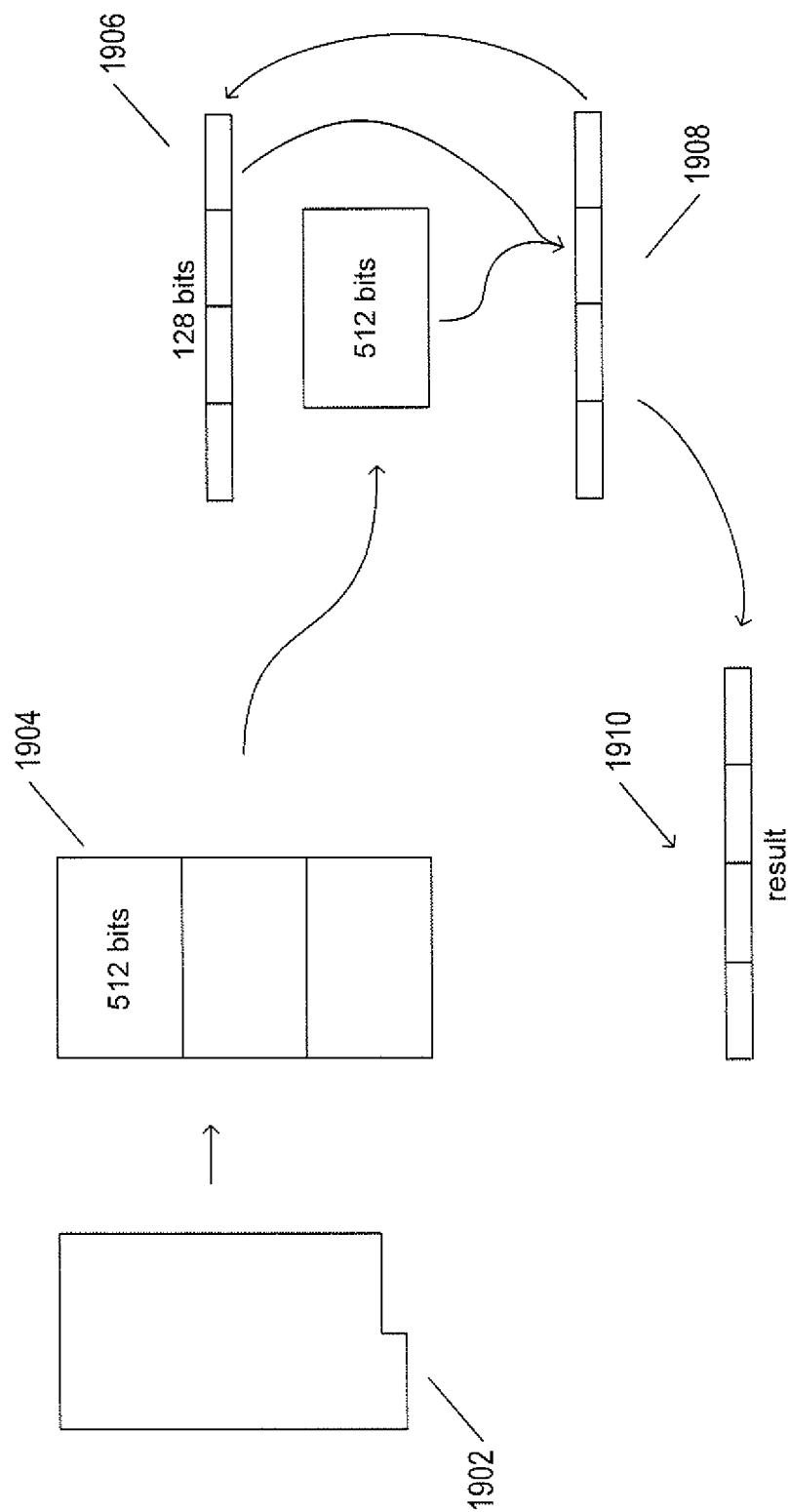
FIGS. 19A-B illustrates generation of a fingerprint from a configuration-element value.
Figure 19B:
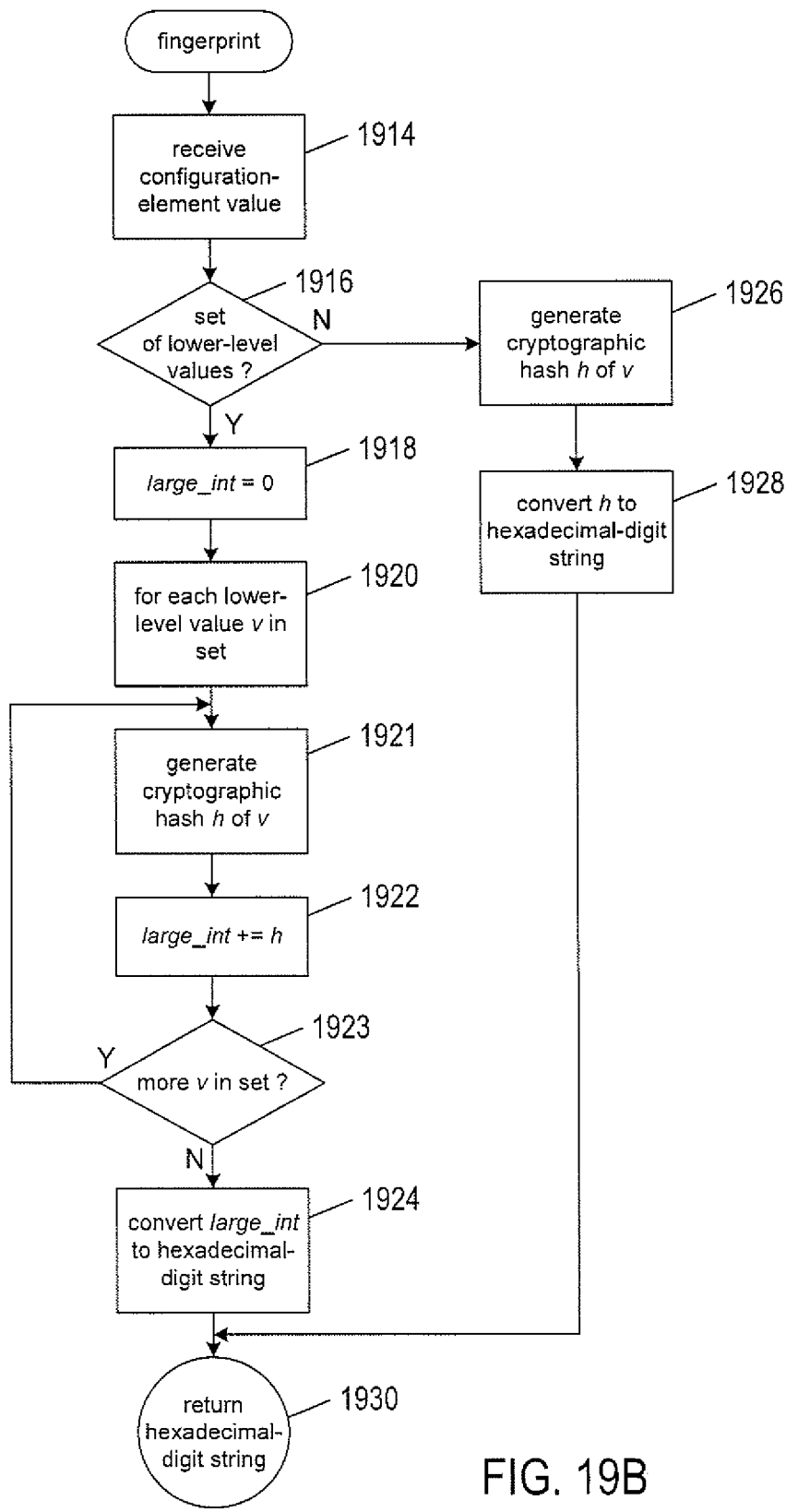

FIGS. 19A-B illustrates generation of a fingerprint from a configuration-element value. FIG. 19A illustrates computation of a cryptographic hash. The cryptographic hash is computed on a variable length input data block 1902. The input data block is padded, in a first operation, to produce a result data block that includes one or more blocks of 512 bits 1904. The padding operation involves deterministic numerical operations that produce different padding values for different input data blocks. Then, a first array of four 32-bit blocks 1906 is initialized to a constant value. The 512-bit blocks in the input data block 1904 are processed iteratively. Each 512-bit block is combined with the current contents of the first array of four 32-bit blocks to produce a result array of four 32-bit blocks 1908. The result array and the first array are then logically switched in preparation for processing of a next 512-bit data block, which can also be thought of as logically copying the contents of the result array back into the first array. When the 512-bit data blocks have been processed, the final contents of the result array are returned as the cryptographic hash 1910. Processing of each 512-bit block is carried out by using numerous logical bit operations and bit-rotation operations between 32-bit blocks of the first array 1906 and 32-bit values within the 512-bit data block. There are numerous different cryptographic hash functions that can be used for generating fingerprints, including the message-digest-5 ("MD5") method and the various secure-hash-algorithm ("SHA") methods, including SHA1, SHA2, and SHA3. A detailed description of the padding and data-block processing operations can be found in any of numerous articles and papers. In essence, the cryptographic hash produces a 128-bit identifier for an input data block of arbitrary length. Of course, since the data blocks are often longer than the identifiers, there is always a potential of a cryptographic-hash collision, in which 2 different data blocks generate the same cryptographic-hash value. However, useful cryptographic-hash algorithms generally ensure that the cryptographic hash generated from two data blocks that differ only slightly are significantly different. While the practical probability of a cryptographic-hash collision is relatively small, that probability can be greatly decreased by using 2 different cryptographic-hash algorithms to generate 2 portions of a composite identifier.

FIG. 19B provides a control-flow diagram for a routine "fingerprint," which generates a cryptographic-hash-based identifier, or fingerprint, for a configuration-element value. In step 1914, the routine "fingerprint" receives a configuration-element value. When the configuration-element value is a set of the lower-level values, as determined in step 1916, a variable large_int is set to 0, in step 1918, and each lower-level value in the set of lower-level values is processed in the for-loop of steps 1920-1923. For each lower-level value v, a cryptographic hash value h is generated, in step 1921, and the cryptographic hash value h is added to the variable large_int, in step 1922. In step 1924, the contents of the variable large_int are converted to a hexadecimal-digit string. When the received configuration-element value is not a set of lower-level values, as determined in step 1916, a cryptographic hash of the received configuration-element value is generated. in step 1926, and is then converted to a hexadecimal-string representation, in step 1928. The hexadecimal-digit string produced either in step 1924 or in step 1928 is returned as the fingerprint in step 1930. The variable large_int is generally a byte array to allow for programmed byte-by-byte addition of cryptographic hash values, which may exceed the magnitudes supported by machine-level addition.

In certain implementations, a configuration-element value may be hierarchically structured, allowing for sets of single values as members of higher-level sets. The fingerprint-generation method discussed above is easily extended to process such hierarchically structured configuration-element values by applying one or more cryptographic-hash functions to each non-set value in the hierarchy in a deterministic sequence, just as unique pathnames are constructed for tree nodes according to a deterministic traversal of a tree. A fingerprint for a file or document configuration-element value can be processed as a set of data blocks or, alternatively, can be processed as a single configuration-element value via a single application of the cryptographic hash function.

FIGS. 20A-D provide control-flow diagrams that illustrate configuration-change and configuration-monitoring functionalities provided by the enhanced control-center subsystem of a distributed WDPAA. Configuration changes to a WDPAA instance are made through the enhanced control-center subsystem, and these configuration changes are automatically propagated by the control-center subsystem to all other WDPAA instances within a distributed WDPAA. In certain implementations, only a subset of the WDPAA instances share a common configuration and therefore provide for flexible load-balancing and workflow-execution-location selection. In the described implementation, all of the WDPAA instances share a common application configuration. The enhanced control-center subsystem essentially continuously normalizes the application configurations of the WDPAA instances so that the WDPAA instances share a common application configuration.

Figure 20A:
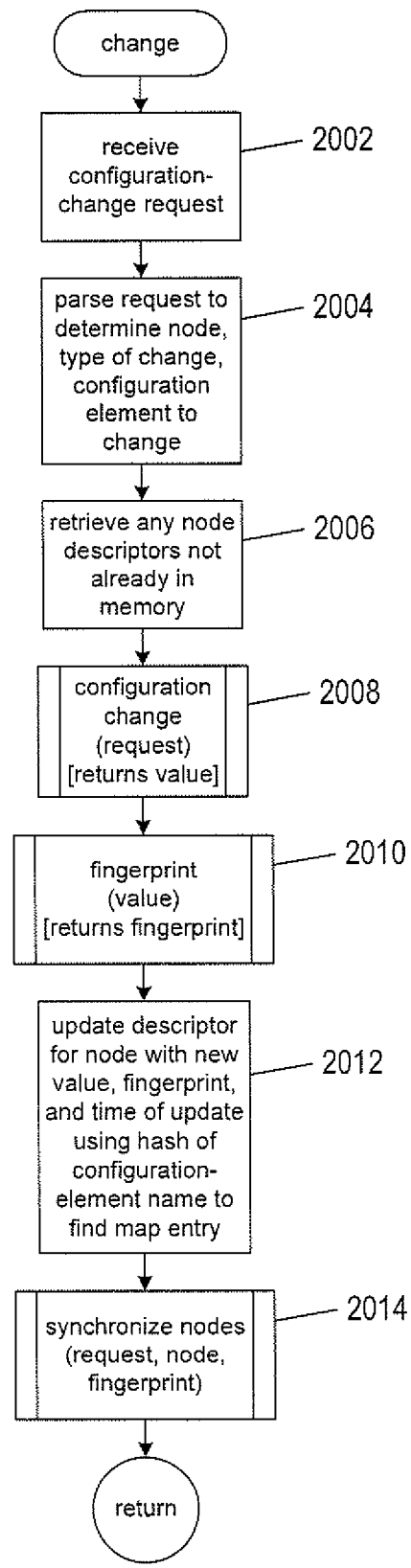
FIGS. 20A-D provide control-flow diagrams that illustrate configuration-change and configuration-monitoring functionalities provided by the enhanced control-center subsystem of a distributed WDPAA.

FIG. 20A provides a control-flow diagram for the routine "change." In step 2002, the routine "change" receives a configuration-change request. The format and the data contents of a configuration-change request very with different implementations. A configuration-change request contains sufficient information to effect a configuration change to a WDPAA instance as well as to the server-configuration-object-based configuration model maintained by the enhanced control-center subsystem. In step 2004, the routine "change" parses the configuration-change request received in step 2002 to determine the node, type of configuration change, and the particular configuration element that is requested to be changed. In step 2006, the routine "change" retrieves any descriptors not already resident in memory from mass storage. In step 2008, the routine "change" calls the routine "configuration change" to make the requested configuration change to the specified WDPAA instance, or node. Details of the routine "configuration change" are system and implementation dependent, and not further discussed below. In step 2010, the routine "fingerprint," discussed above with reference to FIG. 19B, is called to generate a fingerprint for the new configuration-element value returned by the routine "configuration change." In step 2012, the routine "change" updates the descriptor for the specified nodes with the new value and fingerprint, generated in steps 2008 and 2010, and updates any relevant attributes, such as the last update time. The descriptor is updated by generating a hash value for the configuration-element name, specified in the configuration-change request received in step 2002, and using the hash value as an index into the descriptor to find the map entry corresponding to the configuration element. In step 2014, the routine "change" calls a routine "synchronize nodes" to propagate the configuration change, as needed, to the remaining WDPAA instances.

Figure 20B:
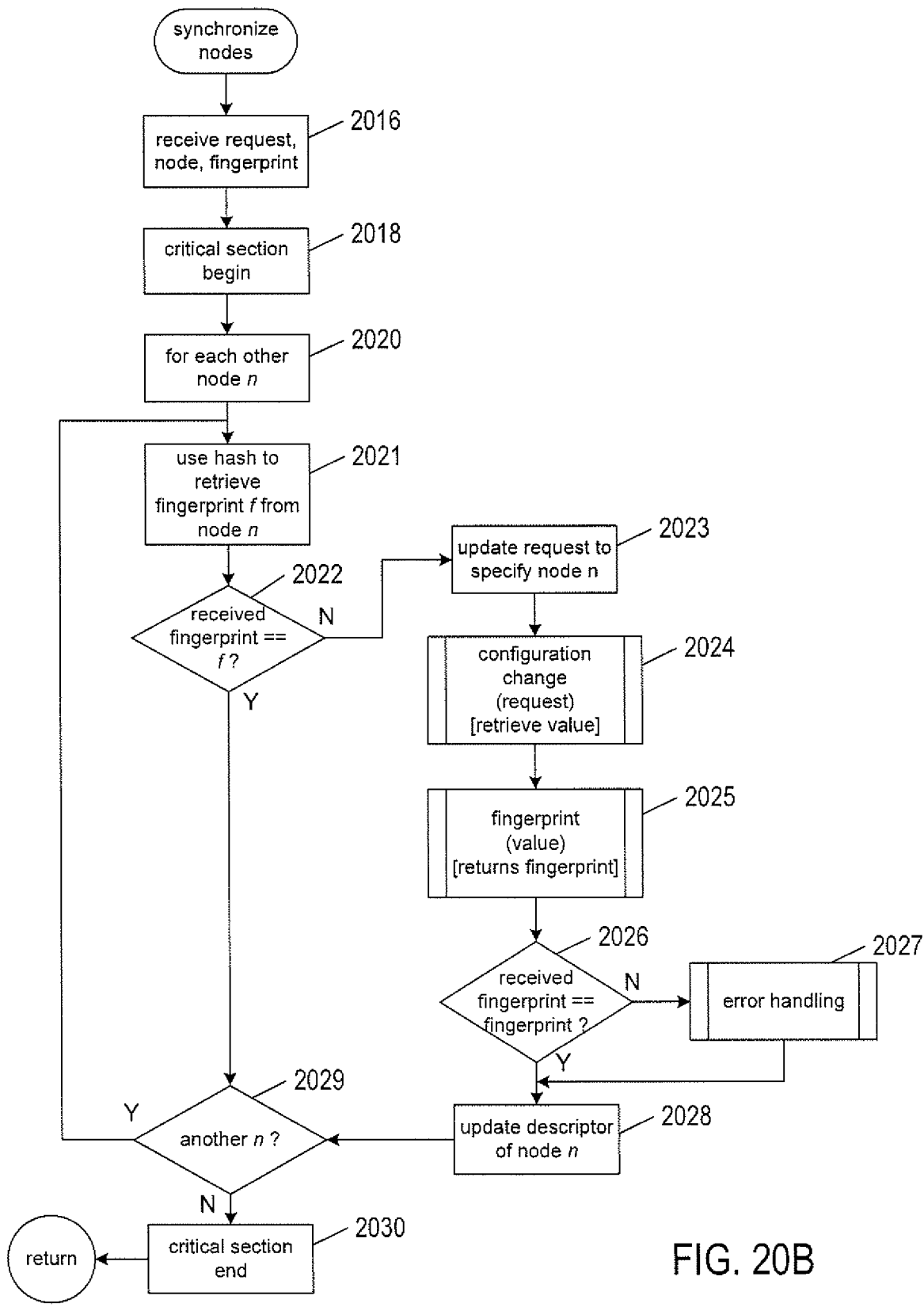

FIG. 20B provides a control-flow diagram for the routine "synchronize nodes," called in step 2014 of FIG. 20A. In step 2016, the routine "synchronize nodes" receives a configuration-change request, node identifier, and fingerprint. In step 2018, the routine "synchronize nodes" begins a critical section in which access to the server-configuration-object-based configuration model is restricted in the case that the control-center subsystem is distributed across multiple instances or employs asynchronous threads. In the for-loop of steps 2020-2029, each node n other than the node identified in the input arguments, in step 2016, is considered. In step 2021, the configuration-element name is hashed to obtain a hash value that is used to retrieve the fingerprint f from the descriptor of a currently considered node and corresponding to the configuration element specified in the configuration-change request received in step 2016. When the fingerprint received in step 2016 is identical to the fingerprint f retrieved from the currently considered node n, as determined in step 2022, no update of node n is needed. Otherwise, in step 2023, the configuration-change request received in step 2016 is updated to specify the currently considered node n and, in step 2024, the routine "configuration change" is called to effect the configuration change with respect to node n. In step 2025, the routine "synchronize nodes" calls the routine "fingerprint," described above with reference to FIG. 19B, to generate a fingerprint for the new configuration-element value returned by the routine "configuration change," in step 2024. When the fingerprint received in step 2016 is identical to the fingerprint returned by the routine "fingerprint," called in step 2025, the descriptor for node n is updated to reflect the configuration change and the new fingerprint, in step 2028. Otherwise, error handling is invoked, in step 2027, to handle the unexpected difference in fingerprint values. In step 2029, the routine "synchronize nodes" determines whether or not another iteration of the for-loop of steps 2020-2029 needs to be carried out and, if so, control returns to step 2021 for the next iteration. Otherwise, in step 2030, the critical section is ended and the routine "synchronize nodes" returns. Thus, the routine "synchronize nodes" ensures that a configuration change made to one WDPAA instance is propagated to all the other WDPAA instances so that all of the WDPAA instances in the distributed WDPAA share a common configuration.

Figure 20C:
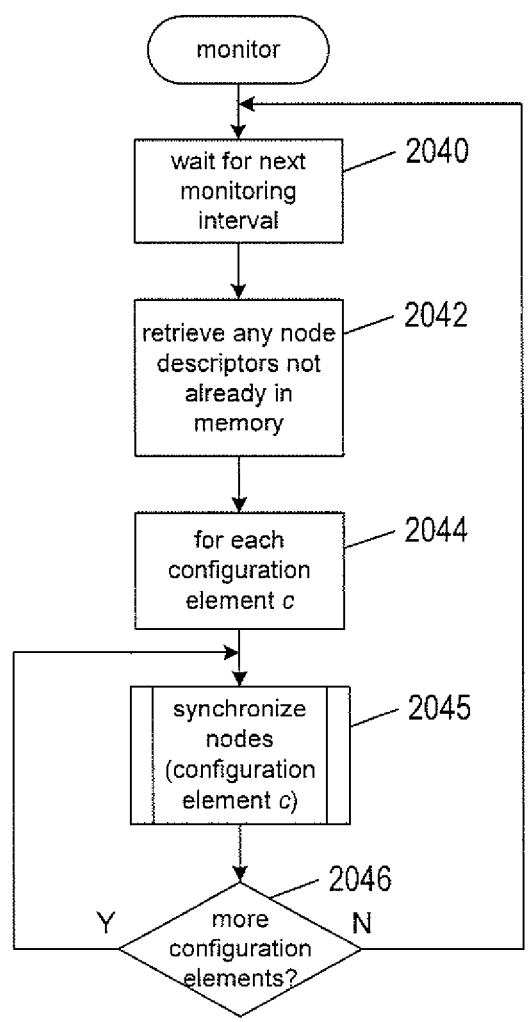

FIG. 20C provides a control-flow diagram for a routine "monitor." The routine "monitor" is periodically called, by the control-center subsystem, to examine the server-configuration-object-based configuration model to ensure that the configurations of all of the WDPAA instances are identical. In step 2040, the routine "monitor" waits for a next monitoring interval. When next monitoring interval arrives, the routine "monitor" retrieves any descriptors not already resident in memory from mass storage. In the for-loop of steps 2044-2046, each configuration element c in the configuration model is considered. The routine "synchronize nodes" is called, in step 2045, for each configuration element c. Note that the routine "synchronize nodes" called in step 2045 is different from the routine "synchronize nodes" called in step 2014 of FIG. 20A.

Figure 20D:
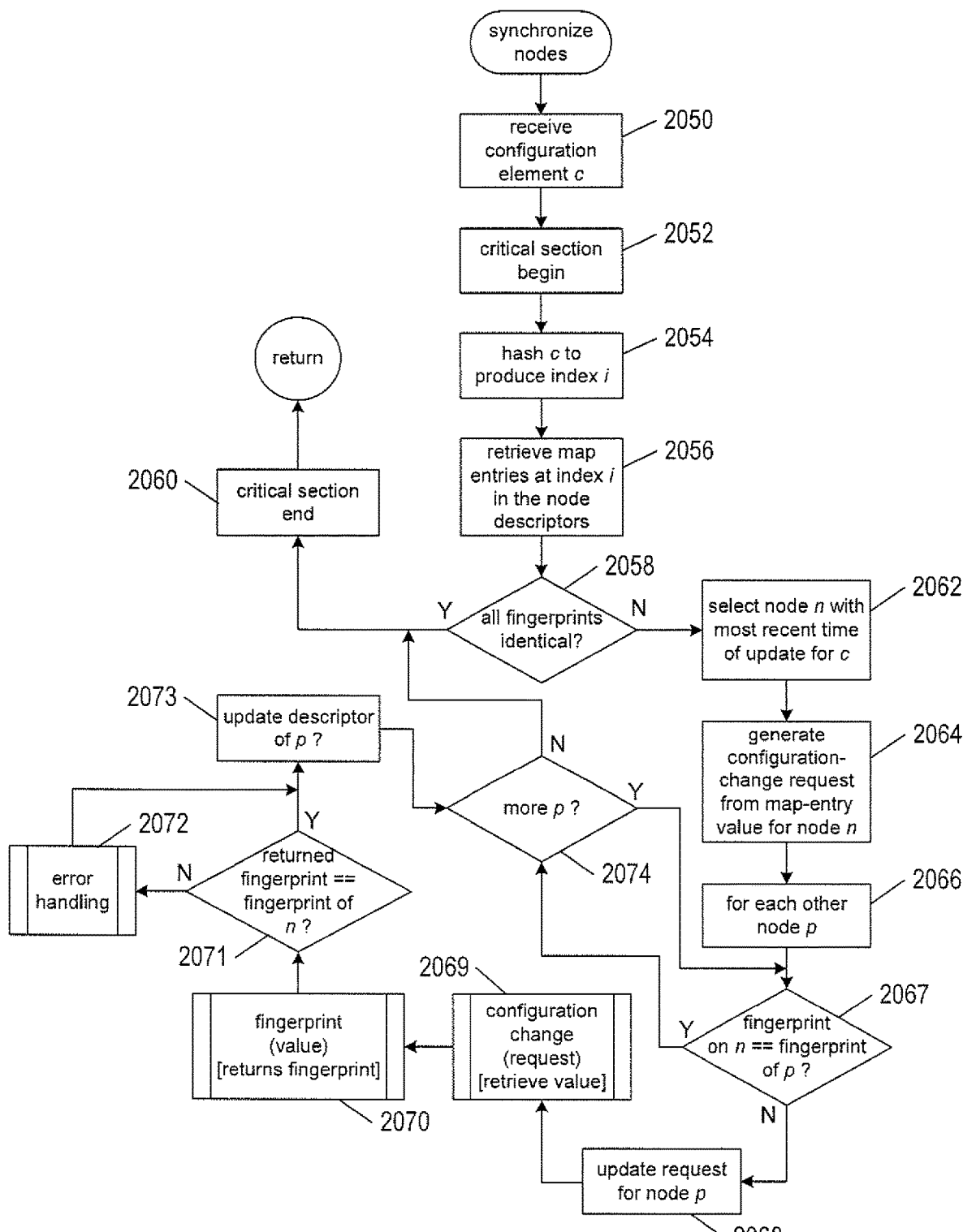

FIG. 20D provides a control-flow diagram for the routine "synchronize nodes," called in step 2045 of FIG. 20C. In step 2050, the routine "synchronize nodes" receives a configuration element c. In step 2052, the routine "synchronize nodes" begins a critical section. In step 2054, the routine "synchronize nodes" hashes the name of configuration-element c to obtain an index i and, in step 2056, uses the index i to retrieve the map entries for configuration-element c in the descriptors for all of the WDPAA instances. When all of the fingerprints in the map entries retrieved in step 2056 are identical, as determined in step 2058, the critical section is ended, in step 2060, and the routine "synchronize nodes" returns. Otherwise, in step 2062, the routine "synchronize nodes" selects a node n with the most recent time of update for configuration-element c. In step 2064, a configuration-change request is generated to effect a configuration change in nodes other than node n so that the nodes other than node n will have the same configuration state for configuration-element c as does node n. Then, in the for-loop of steps 2066-2074, each of the nodes p other than node n is considered. When the fingerprint for the configuration element c in node n is equal to the fingerprint for configuration-element c in node p, as determined in step 2067, node p does not need to be updated and control therefore flows to step 2074, discussed below. Otherwise, the configuration-change request is updated to specify node p, in step 2068, and is then furnished to the routine "configuration change," called in step 2069, to effect the configuration change to node p. The routine "fingerprint" is called, in step 2070, to generate a new fingerprint for the new value for configuration-element c returned by the routine "configuration change." When the new fingerprint is equal to the fingerprint of node n, as determined in step 2071, the descriptor for node p is updated to reflect the configuration change in the fingerprint, in step 2073. Otherwise, error handling is invoked, in step 2072, to handle the unexpected difference in fingerprints. When there are more nodes p to consider, as determined in step 2074, control returns to step 2067 for a next iteration of the for-loop of steps 2066-2074. Otherwise, control flows to step 2060, in which a critical section is ended and following which the routine "synchronize nodes" returns. In an alternate implementation, rather than iteratively changing the configurations of nodes in the for-loop of steps 2066-2074, the routine "change" can be called once, on one of the nodes, with automatic propagation of the configuration change to the other nodes.

Although the present invention has been described in terms of particular embodiments, it is not intended that the invention be limited to these embodiments. Modifications within the spirit of the invention will be apparent to those skilled in the art. For example, any of many different implementation and design parameters, including choice of operating system, virtualization layer, hardware platform, programming language, modular organization, control structures, data structures, and other such design and implementation parameters can be varied to generate a variety of alternative implementations of the current disclosed distributed-application-node monitoring and the synchronization functionalities and subsystems. As another example, any of many different types of naming conventions can be used to assign unique names to each configuration element. The control-center subsystem may also provide additional configuration-related functionalities, such as adding new configuration elements and deleting configuration elements from the server-configuration-object-based configuration model.

The invention claimed is:

1. A distributed-application system comprising:
   multiple server computers, each having one or more processors, one or more memories, and one or more mass-storage subsystems, including a management server computer and multiple additional server computers;
   multiple application instances that each executes within a different one of the multiple additional server computers and that each has a configuration;
   a server-configuration-object-based configuration model for a distributed application that is persisted in one of the one or more mass-storage subsystems and that comprises a set of server-configuration objects that each describes a configuration of one of the multiple application instances; and
   a synchronization subsystem that continuously normalizes the application configurations of the multiple application instances to a common application configuration.

2. The distributed-application system of claim 1 wherein the distributed-application system is a distributed workflow-development-and-process-automation application that provides workflow-development and workflow-execution services with access to management-server services.

3. The distributed-application system of claim 2 wherein the distributed-application system provides work-flow execution for a cloud-management system that additionally includes an automated-application-release-management subsystem and an infrastructure-management-and-administration subsystem.

4. The distributed-application system of claim 1 wherein one of the application configurations includes:
   identifiers for, and attributes that describe, plug-in components of the application;
   trusted certificates;
   configured-application certificates; and
   parameters.

5. The distributed-application system of claim 1 wherein each of the application configurations includes multiple configuration elements, each configuration element having a name, represented as a string, and a value.

6. The distributed-application system of claim 5 wherein each of the configuration-element values is one of:
   a single value; and
   a set of single values.

7. The distributed-application system of claim 6 wherein the single value is represented as one of:
   an integer;
   a string;
   a file;
   a document; and
   a floating-point number.

8. The distributed-application system of claim 6 wherein the server-configuration-object-based configuration model comprises:
   a server-configuration object for each of the application instances, each of the server-configuration objects including representations of multiple configuration elements in the application configuration, each configuration-element representation including a representation of the configuration-element name, a representation of the configuration-element value, and a fingerprint corresponding to the configuration-element value.

9. The distributed-application system of claim 8 wherein the synchronization subsystem includes a configuration-change facility that:
   receives a configuration-change request;

carries out a configuration change specified in the configuration-change request on an application instance specified in the configuration-change request with respect to a configuration element specified in the configuration-change request;

updates the server-configuration object for the specified application instance to include a new configuration-element value and a new fingerprint for the configuration element specified in the configuration-change request;

compares the new fingerprint for the configuration element specified in the configuration-change request to the fingerprints for the specified configuration element in the server-configuration objects for the application instances not specified in the configuration-change request to identify not-yet-updated application instances; and for each not-yet-updated application instance,
  carries out the configuration change specified in the configuration-change request on the not-yet-updated application instance with respect to the configuration element specified in the configuration-change request, and
  updates the server-configuration object for the not-yet-updated application instance to include the new configuration-element value and the new fingerprint for the configuration element specified in the configuration-change request.

10. The distributed-application system of claim 8 wherein the synchronization subsystem includes a configuration-monitoring facility that monitors the server-configuration-object-based configuration model to detect application-configuration differences in the application configurations of the application instances and that applies configuration changes to reconcile the detected application-configuration differences so that the multiple application instances share a common application configuration.

11. The distributed-application system of claim 10 wherein the configuration-monitoring facility monitors the server-configuration-object-based configuration model by:
  for each configuration element,
    comparing the fingerprints associated with the configuration element in the server-configuration objects for the application instances to determine whether the application instances have the same configuration-element value for the configuration element, and
    when the application instances do not have the same configuration-element value for the configuration element,
      selecting a configuration-element value for the configuration element, and
      changing the configurations of those application instances with configuration-element values different from the selected a configuration-element value.

12. The distributed-application system of claim 8 wherein the fingerprint corresponding to one of the configuration-element values that is a single value is generated by:
  applying a cryptographic hash function to the single value to generate a cryptographic hash value; and
  converting the cryptographic hash value to a hexadecimal string.

13. The distributed-application system of claim 8 wherein the fingerprint corresponding to one of the configuration-element values that is a set of values is generated by:
  initializing an accumulator to 0;
  for each single value in the set of values,
    applying a cryptographic hash function to the single value to generate a cryptographic hash value, and
    adding the cryptographic hash value to the accumulator; and
  converting the value in the accumulator to a hexadecimal string.

14. A method that synchronizes application configurations of multiple application instances of a distributed application that each has a configuration and that each executes on a different one of multiple server computers, each having one or more processors, one or more memories, and one or more mass-storage subsystems, the method comprising:
  maintaining a server-configuration-object-based configuration model for the distributed application that is persisted in one of the one or more mass-storage subsystems and that comprises a set of server-configuration objects that each describes a configuration of one of the multiple application instances; and
  continuously normalizing the application configurations of the multiple application instances to a common application configuration.

15. The method of claim 14
  wherein each of the application configurations describes plug-in components of an application, trusted certificates, configured-application certificates, and parameters;
  wherein each of the application configurations includes multiple configuration elements, each configuration element having a name, represented as a string, and a value; and
  wherein a configuration-element value is one of
    a single value, and
    a set of single values.

16. The method of claim 14 wherein the server-configuration-object-based configuration model comprises:
  a server-configuration object for each of the application instances, each of the server-configuration objects including representations of multiple configuration elements in the application configuration, each configuration-element representation including a representation of the configuration-element name, a representation of the configuration-element value, and a fingerprint corresponding to the configuration-element value.

17. The method of claim 16 wherein continuously normalizing the application configurations of the multiple application instances to a common application configuration further comprises:
  receiving a configuration-change request;
  carrying out a configuration change specified in the configuration-change request on an application instance specified in the configuration-change request with respect to a configuration element specified in the configuration-change request;
  updating the server-configuration object for the specified application instance to include a new configuration-element value and a new fingerprint for the configuration element specified in the configuration-change request;
  comparing the new fingerprint for the configuration element specified in the configuration-change request to the fingerprints for the specified configuration element in the server-configuration objects for the application instances not specified in the configuration-change request to identify not-yet-updated application instances; and
  for each not-yet-updated application instance, carrying out the configuration change specified in the configuration-change request on the not-yet-updated application instance with respect to the configuration element specified in the configuration-change request, and updating the server-configuration object for the not-yet-updated application instance to include the new configuration-element value and the new fingerprint for the configuration element specified in the configuration-change request.

18. The method of claim 16 wherein continuously normalizing the application configurations of the multiple application instances to a common application configuration further comprises:

monitoring the server-configuration-object-based configuration model to detect application-configuration differences in the application configurations of the application instances and applying configuration changes to reconcile the detected application-configuration differences so that the multiple application instances share a common application configuration by for each configuration element, comparing the fingerprints associated with the configuration element in the server-configuration objects for the application instances to determine whether the application instances have the same configuration-element value for the configuration element, and when the application instances do not have the same configuration-element value for the configuration element, selecting a configuration-element value for the configuration element, and changing the configurations of those application instances with configuration-element values different from the selected a configuration-element value.

19. The method of claim 16
wherein the fingerprint corresponding to one of the configuration-element values that is a single value is generated by applying a cryptographic hash function to the single value to generate a cryptographic hash value, and converting the cryptographic hash value to a hexadecimal string; and wherein the fingerprint corresponding to one of the configuration-element values that is a set of values is generated by initializing an accumulator to 0, for each single value in the set of values, applying a cryptographic hash function to the single value to generate a cryptographic hash value, and adding the cryptographic hash value to the accumulator, and converting the value in the accumulator to a hexadecimal string.

20. A physical data-storage device that stores a sequence of computer instructions that, when executed by one or more processors within multiple server computers, each having one or more processors, one or more memories, and one or more mass-storage subsystems, and each executing an application instance of a distributed application, control the distributed application to:

maintain a server-configuration-object-based configuration model for the distributed application that is persisted in one of the one or more mass-storage subsystems and that comprises a set of server-configuration objects that each describes a configuration of one of the multiple application instances; and continuously normalize application configurations of the multiple application instances to a common application configuration.

* * * * *